United States Patent
Koyama

(10) Patent No.: US 8,701,994 B2
(45) Date of Patent: Apr. 22, 2014

(54) IDENTIFYING INFORMATION ACCESS DEVICE

(71) Applicant: Universal Entertainment Corporation, Tokyo (JP)

(72) Inventor: Toshimi Koyama, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

(21) Appl. No.: 13/846,962

(22) Filed: Mar. 19, 2013

(65) Prior Publication Data

US 2013/0270342 A1    Oct. 17, 2013

(30) Foreign Application Priority Data

Apr. 13, 2012    (JP) .................................. 2012-091678

(51) Int. Cl.
*G06K 7/00*    (2006.01)

(52) U.S. Cl.
USPC ............ 235/439; 235/375; 235/487; 235/451

(58) Field of Classification Search
USPC .......... 235/439, 380, 492, 451, 375, 487, 449
See application file for complete search history.

(56) References Cited

U.S. PATENT DOCUMENTS

| | | | |
|---|---|---|---|
| 3,839,307 A | 10/1974 | Schmifg | |
| 4,409,540 A | 10/1983 | Jones | |
| 2008/0006695 A1* | 1/2008 | Morita | 235/449 |
| 2008/0210762 A1* | 9/2008 | Osada et al. | 235/492 |
| 2009/0091501 A1* | 4/2009 | Mizoroki et al. | 343/702 |
| 2010/0176202 A1* | 7/2010 | Teraoka et al. | 235/492 |

* cited by examiner

*Primary Examiner* — Edwyn Labaze
(74) *Attorney, Agent, or Firm* — Lexyoume IP Meister, PLLC

(57) ABSTRACT

It is possible to read from and write in an RFID tag, and also to operate other devices. A non-contact control device is provided which is formed to have no electrical contact with the electromagnetic wave generating antenna part and integrally with the electromagnetic wave generating antenna part. The non-contact control device receives an electromagnetic wave generated by the electromagnetic wave generating antenna part to generate electric power, and controls a controlled device based on the generated electric power.

9 Claims, 13 Drawing Sheets

FIG. 9
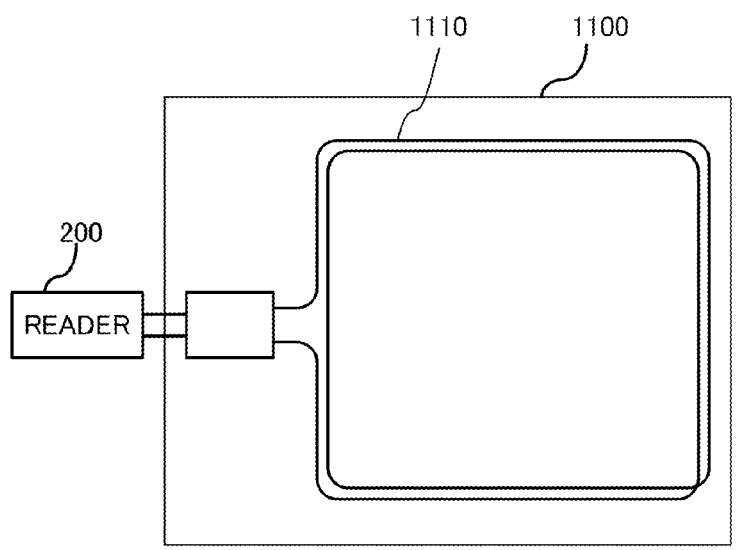
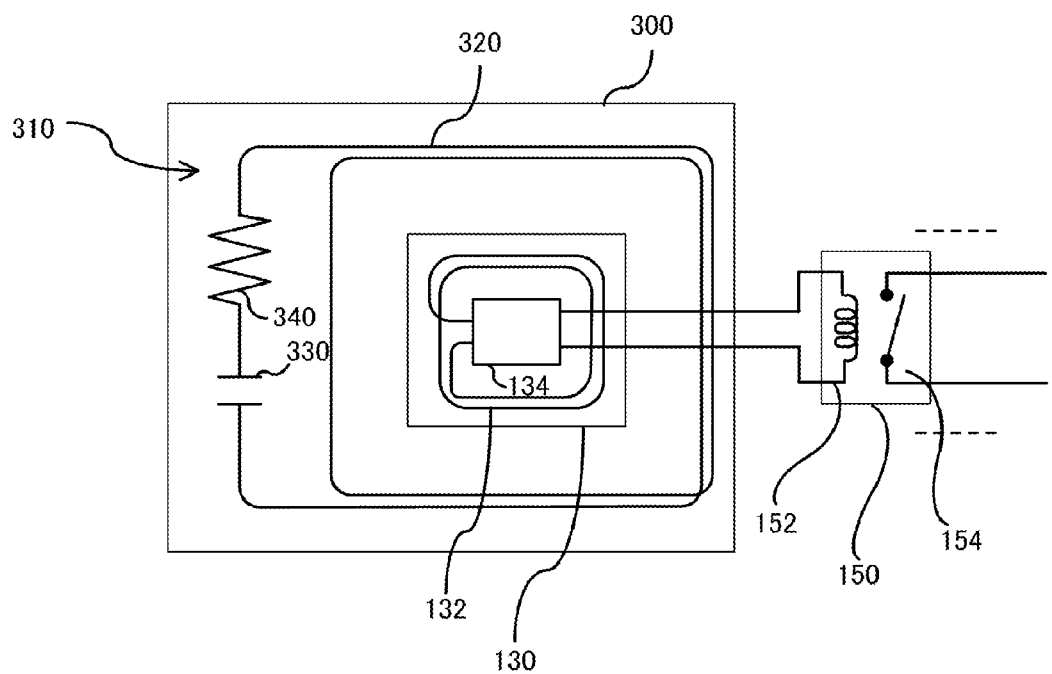

IDENTIFYING INFORMATION ACCESS DEVICE

CROSS REFERENCE TO RELATED APPLICATIONS

This application claims priority of Japanese Patent Application No. 2012-091678 filed on Apr. 13, 2012. The contents of this application are incorporated herein by reference in their entirety.

BACKGROUND OF THE INVENTION

1. Field of the Invention

The present invention relates to an identifying information access device for accessing RFID tag, and more specifically to an identifying information access device for accessing a gaming chip used in a casino and the like.

2. Description of the Related Art

A gaming chip having an integrated RFID tag is used in a casino and the like for the purpose of authentication and automatic measurement of the gaming chip. More specifically, an antenna for reading the RFID is provided on the underside of the gaming table, and a magnetic field is generated from the antenna. The identification information (a unique ID) of a betting chip has been detected in such a manner that an electromotive force is caused by the RFID tag so that the generated magnetic field penetrates the gaming chip placed on the gaming table (for example, refer to Japanese Patent No. 3839307 and Japanese Patent No. 4409540).

The range in which the magnetic field generated from the antenna extends is decided by the shape of the antenna and an output of an RF signal applied to the antenna. Therefore, when the distance between the RFID tag and the antenna is farther than a predetermined distance appropriate for the sensitivity of the RFID tag, the electromotive force for operating the RFID tag is not caused. Thus, it becomes difficult to read out a variety of information such as ID of the RFID tag.

If the range in which the magnetic field generated from the antenna extends is expanded, it is possible to read out the RFID tag positioned farther than the predetermined distance from the antenna. However, if there is an undesired RFID tag within the extent of the magnetic field, its RFID tag may be read out. Therefore, it has been desired to achieve the control for expanding the extent of the magnetic field generated from the antenna, as well as for extending the magnetic field only over a desired range.

SUMMARY OF THE INVENTION

As mentioned above, when both the control of expanding the region in which the magnetic field extends and the control of narrowing the region in which the magnetic field extends are carried out at the same time, it is necessary to generate control signals for both of them to supply them to a wiring. However, it is considered that the control may be complicated when the different control signals are generated in such a manner, and also the structure and the process may be complicated due to the wiring of the control signal lines for each of them, etc.

An identifying information access device has been thus desired which is capable of generating a magnetic field only within a desired range, as well as capable of simplifying the control and structure. In particular, an identifying information access device has been desired which is capable of reading/writing an RFID tag, as well as capable of operating other devices.

In view of foregoing, the present invention is made for the purpose of providing an identifying information access device which is capable of reading/writing an RFID tag, as well as operating other devices.

An embodiment of the present invention is to provide an identifying information access device for reading and writing identifying information stored in an RFID IC tag included in a storage medium, provided with an electromagnetic wave generating antenna part for generating an electromagnetic wave; a non-contact control device formed to have no electrical contact with the electromagnetic wave generating antenna part and integrally with the electromagnetic wave generating antenna part, the non-contact control device receiving an electromagnetic wave generated by the electromagnetic wave generating antenna part to generate electric power, and controlling a controlled device based on the generated electric power.

Furthermore, an embodiment of the present invention is the above-mentioned structure, wherein the non-contact control device has an electromagnetic wave receiving antenna part for receiving an electromagnetic wave generated by the electromagnetic wave generating antenna part; and the electromagnetic wave receiving antenna part is formed integrally with the electromagnetic wave generating antenna part on an antenna base plate.

Furthermore, an embodiment of the present invention is the above-mentioned structure, further provided with a reading/writing control device for controlling the reading and writing of the identifying information by supplying an RF signal to the electromagnetic wave generating antenna part, wherein the electromagnetic wave receiving antenna part has no electrical contact with the reading/writing control device and the electromagnetic wave generating antenna part.

Still further, an embodiment of the present invention is the above-mentioned structure, wherein the electromagnetic wave receiving antenna part generates an induced current based on the received electromagnetic wave; and the non-contact control device generates electric power based on the induced current to supply the electric power to the controlled device, and drives the controlled device to go into ON state or OFF state.

Furthermore, an embodiment of the present invention is the above-mentioned structure, provided with at least one magnetic field control antenna part connected to the controlled device and arranged in the vicinity of the electromagnetic wave generating antenna part, wherein the magnetic field control antenna part emits a predetermined magnetic field upon going into ON state by the controlled device.

Here, the phrase "the vicinity of the electromagnetic wave generating antenna part" refers to the extent and region in which the magnetic field control antenna part can emit a predetermined magnetic field to reach the magnetic field generated by the electromagnetic field generating antenna part.

Furthermore, an embodiment of the present invention is the above-mentioned structure, provided with at least one sub-control device having an electrical contact with the controlled device and controlling the controlled device separately from the non-contact control device, wherein the sub-control device receives an electromagnetic wave to generate electric power, and controls the controlled device based on the generated electric power.

Furthermore, an embodiment of the present invention is to provide an identifying information access device for reading and writing identifying information stored in an RFID IC tag included in a storage medium, provided with an electromagnetic wave generating antenna part for generating an electromagnetic wave; a resonance antenna part formed to have no electrical contact with the electromagnetic wave generating antenna part, the resonance antenna part having a resonance part for receiving an electromagnetic wave emitted from the electromagnetic wave generating antenna part and resonating with the received electromagnetic wave to generate a resonance electromagnetic wave; and a non-contact control device formed to have no electrical contact with the electromagnetic wave generating antenna part and the resonance antenna part and integrally with the resonance antenna part, the non-contact control device receiving an electromagnetic wave generated by the resonance antenna part to generate electric power, and controlling a controlled device based on the generated electric power.

Furthermore, an embodiment of the present invention is the above-mentioned structure, wherein the non-contact control device has an electromagnetic wave receiving antenna part for receiving an electromagnetic wave generated by a resonance antenna part; and the electromagnetic wave receiving antenna part can be formed integrally with the resonance antenna part on an antenna base plate.

Furthermore, an embodiment of the present invention is the above-mentioned structure, further provided with a reading/writing control device for controlling the reading and writing of the identifying information by supplying an RF signal to the electromagnetic wave generating antenna part, wherein the electromagnetic wave receiving antenna part has no electrical contact with the reading/writing control device, the electromagnetic wave generating antenna part, and the resonance antenna part.

Still further, an embodiment of the present invention is the above-mentioned structure, wherein the resonance antenna part generates an induced current based on the received electromagnetic wave; and the non-contact control device generates electric power based on the induced current to supply the electric power to the controlled device, and brings the controlled device into ON state or OFF state.

It is possible to read/write an RFID tag, and also to operate other devices.

BRIEF DESCRIPTION OF THE DRAWINGS

FIG. 2 is a schematic diagram showing a structure of the identifying information access device according to a first embodiment.

FIG. 9 is a diagram showing a structure of a first antenna device 1100 and a second antenna device 300 of the identifying information access device according to the second embodiment.

DESCRIPTION OF THE PREFERRED EMBODIMENTS

Embodiments will be described below based on drawings.
<<<Overview of Identifying Information Access Device According to Embodiments of the Present Invention>>>

FIGS. 1A-1, 1A-2, and 1B are diagrams showing an overview of an identifying information access device according to an embodiment of the present invention.

Figures 1, 1A:
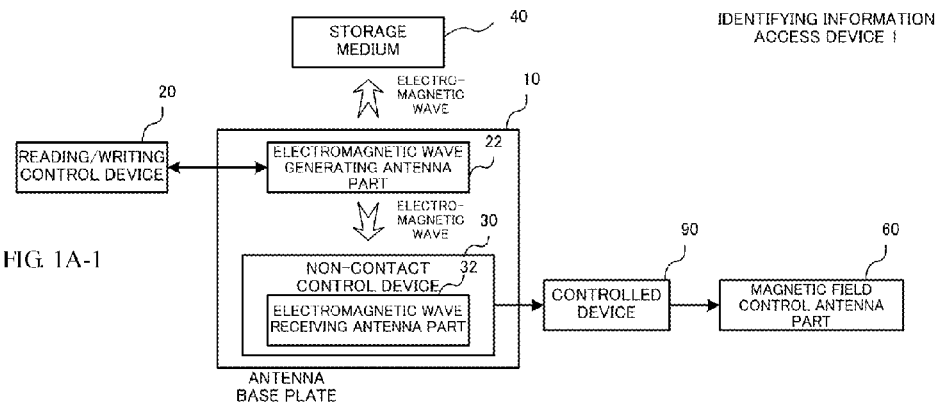
FIGS. 1A-1, 1A-2, and 1B are diagrams showing an overview of an identifying information access device according to an embodiment of the present invention.
Figures 1, 1A, 2:
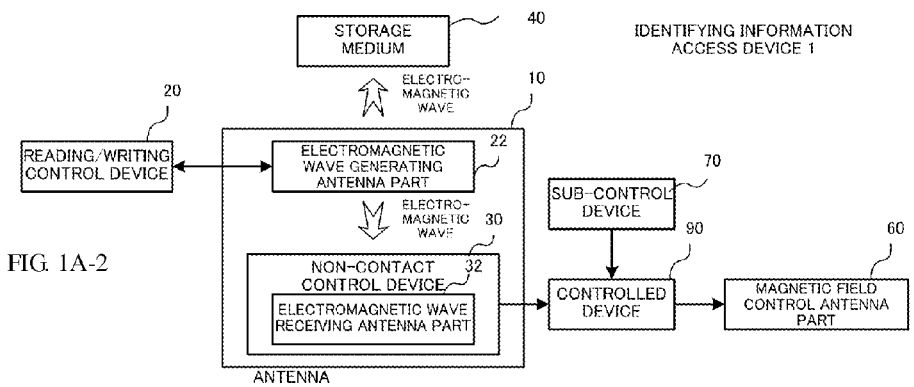

As shown in FIGS. 1A-1 and 1A-2, an identifying information access device 1 according to an embodiment of the present invention reads/writes identifying information stored in an RFID IC tag included in a storage medium 40, and provided with an electromagnetic wave generating antenna part 22 (such as an antenna 110) for generating an electromagnetic wave, a non-contact control device 30 (such as an ON/OFF control device 130) formed to have no electrical contact with the electromagnetic wave generating antenna part 22 and integrally with the electromagnetic wave generating antenna part 22, the non-contact control device 30 (such as an ON/OFF control device 130) receiving an electromagnetic wave generated by the electromagnetic wave generating antenna part 22 to generate electric power, and controlling a controlled device 90 (such as a controlled circuit 190) based on the generated electric power.

The identifying information access device 1 according to an embodiment of the present invention is provided with the electromagnetic wave generating antenna part 22 and the non-contact control device 30. The electromagnetic wave generating antenna part 22 generates an electromagnetic wave.

The non-contact control device 30 is formed to have no electrical contact with the electromagnetic wave generating antenna part 22. The non-contact control device 30 is also formed integrally with the electromagnetic wave generating antenna part 22. The non-contact control device 30 receives an electromagnetic wave generated by the electromagnetic wave generating antenna part 22 to generate electric power. The non-contact control device 30 also controls the controlled device 90 based on the generated electric power. The non-contact control device 30 can be controlled by receiving the electromagnetic wave without wired connection between the non-contact control device 30 and the electromagnetic wave generating antenna part 22.

The non-contact control device 30 receives the electromagnetic wave to generate power and controls the controlled device based on the generated electric power, so that it is possible to read/write an RFID tag as well as control the controlled device 90 to operate. The non-contact control device 30 is formed integrally with the electromagnetic wave generating antenna part 22 and thus is not required to be assembled separately, so that the non-contact control device 30 can be easily manageable.

As shown in FIGS. 1A-1 and 1A-2, in the identifying information access device 1 according to an embodiment of the present invention, the non-contact control device 30 has an electromagnetic wave receiving antenna part 32 (such as an antenna 132) for receiving an electromagnetic wave generated by the electromagnetic wave generating antenna part 22, and the electromagnetic wave receiving antenna part 32 is formed integrally with the electromagnetic wave generating antenna part 22 on a antenna base plate.

The non-contact control device 30 has the electromagnetic wave receiving antenna part 32. The electromagnetic wave receiving antenna part 32 receives an electromagnetic wave generated by the electromagnetic wave generating antenna part 22. Furthermore, the electromagnetic wave receiving antenna part 32 receives an electromagnetic wave to generate electric power.

The non-contact control device 30 receives the electromagnetic wave at the electromagnetic wave receiving antenna part 32 to generate electric power and controls the controlled device 90 based on the generated electric power, so that it is possible to read from and write in an RFID tag as well as control the controlled device 90 to operate. Since the electromagnetic wave receiving antenna part 32 is formed integrally with the electromagnetic wave generating antenna part 22, the electromagnetic wave receiving antenna part 32 is not required to be assembled separately and thus can be easily manageable.

As shown in FIGS. 1A-1 and 1A-2, the identifying information access device 1 according to an embodiment of the present invention is further provided with a reading/writing control device 20 (such as an RF reader/writer 200) for controlling the reading and writing of the identifying information by supplying an RF signal to the electromagnetic wave generating antenna part 22, and the electromagnetic wave receiving antenna part 32 has no electrical contact with the reading/writing control device 20 and the electromagnetic wave generating antenna part 22.

The electromagnetic wave receiving antenna part 32 has no electrical contact with the reading/writing control device 20 and the electromagnetic wave generating antenna part 22, and thus can control the controlled device 90 without wiring for transmitting a control signal. Since any wiring is not necessary, the structure of the non-contact control device 30 can be simplified and the assembling process thereof can be easy. The non-contact control device 30 can be controlled by receiving the electromagnetic wave without wired connection to the reading/writing control device 20 and the electromagnetic wave generating antenna part 22.

As shown in FIGS. 1A-1 and 1A-2, in the identifying information access device according to an embodiment of the present invention, the electromagnetic wave receiving antenna part 32 generates an induced current based on the received electromagnetic wave, and the non-contact control device 30 generates power based on the induced current to supply the power to the controlled device 90, and drives the controlled device 90 to go into ON state or OFF state.

Since the controlled device 90 can be brought into ON state or OFF state based on the induced current, the controlled device 90 can be ON/OFF controlled without wiring for transmitting the control signal.

As shown in FIGS. 1A-1 and 1A-2, the identifying information access device 1 according to an embodiment of the present invention is provided with at least one magnetic field control antenna part 60 (such as an antenna for demagnetizing field generation 160) which is connected to the controlled device 90 and is arranged at a position overlapping other electromagnetic wave generating antenna part 22 than the aforementioned electromagnetic wave generating antenna part 22. The magnetic field control antenna part 60 emits a predetermined magnetic field by a magnetic field emitted from the electromagnetic wave generating antenna part 22 upon going into ON state by the controlled device 90.

The magnetic field control antenna part 60 emits a predetermined magnetic field upon going into ON state by the controlled device 90, so that the magnetic field can be combined with the magnetic field based on the electromagnetic wave generated by the electromagnetic wave generating antenna part 22 to generate a desired magnetic field.

As shown in FIG. 1A-2, the identifying information access device 1 according to an embodiment of the present invention can be additionally provided with at least one sub-control device 70 (such as an ON/OFF control device 170) having an electrical contact with the controlled device 90 and controlling the controlled device 90 separately from the non-contact control device 30.

The sub-control device 70 receives an electromagnetic wave to generate power, and controls the controlled device 90 based on the generated power.

In this case, a frequency of the electromagnetic wave for controlling the controlled device 90 is preferably different from a frequency of the electromagnetic wave that is generated at the original electromagnetic wave generating antenna part 22.

Both the non-contact control device 30 and the sub-control device 70 control the controlled device 90, so that the controlled device 90 can be meticulously controlled while being kept in ON state.

Figure 1B:
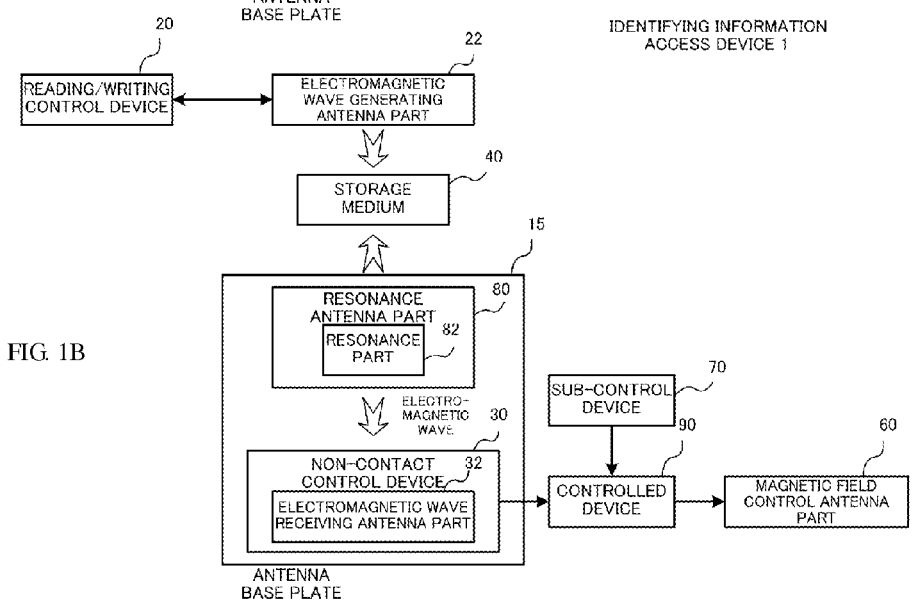
Figure 2:
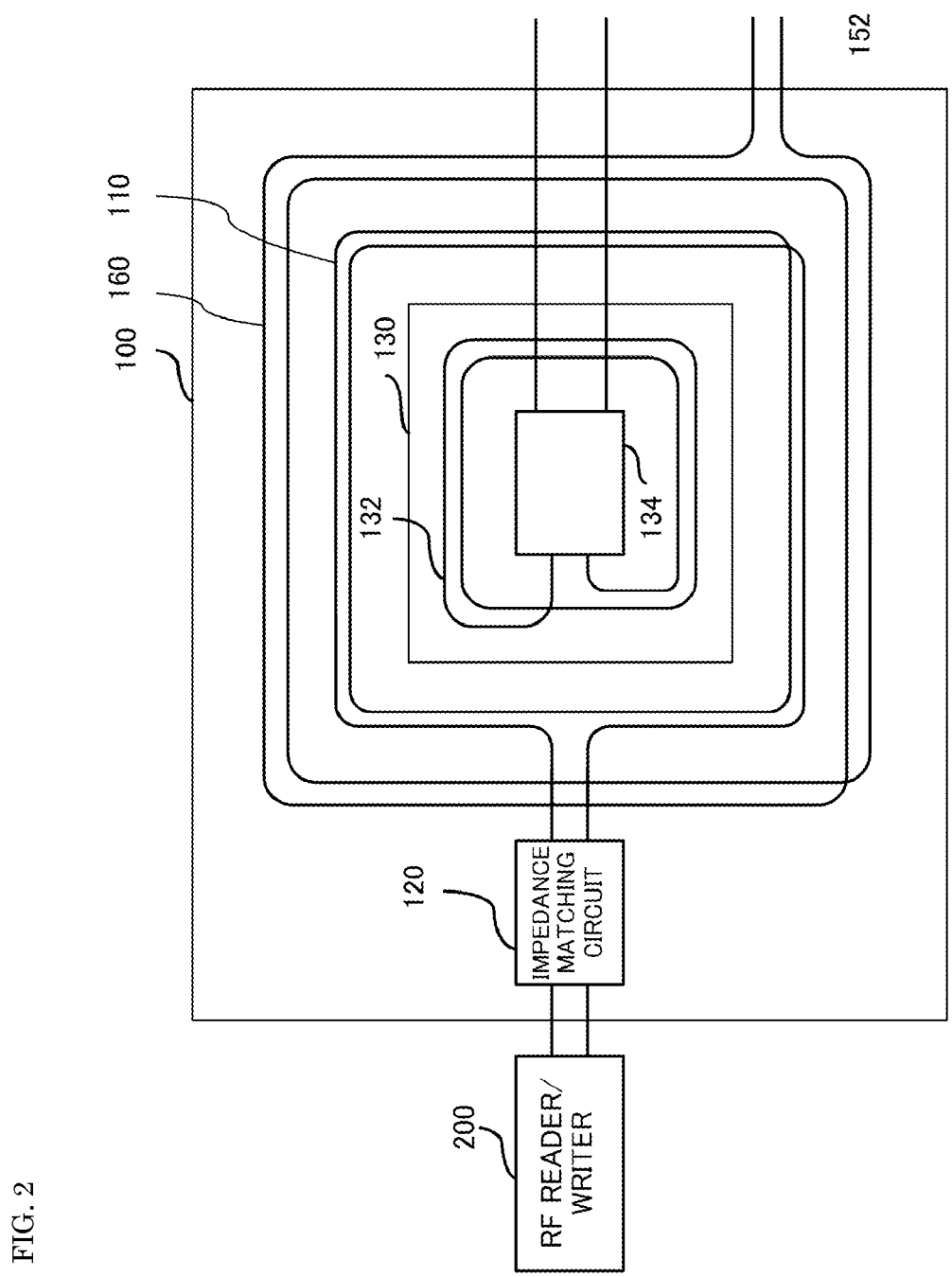

As shown in FIG. 1B, an identifying information access device 1' according to an embodiment of the present invention, which reads/writes identifying information stored in an RFID IC tag included in a storage medium 40, is provided with an electromagnetic wave generating antenna part 22 (such as an antenna 1110 of a first antenna device 1100) for generating an electromagnetic wave, a resonance antenna part 80 (such as an antenna 320 of a second antenna device 300) formed to have no electrical contact with the electromagnetic wave generating antenna part 22, the resonance antenna part having a resonance part 82 (such as a resistor 340 and a capacitor 330 and the like of the second antenna device 300) for receiving an electromagnetic wave emitted from the electromagnetic wave generating antenna part 22 and resonating with the received electromagnetic wave to emit a resonance electromagnetic wave, and a non-contact control device 30 (such as an ON/OFF control device 130 of the second antenna device 300) formed to have no electrical contact with the electromagnetic wave generating antenna part 22 and the resonance antenna part 80 and integrally with the resonance antenna part 80, the non-contact control device 30 receiving an electromagnetic wave generated by the resonance antenna part 80 to generate electric power, and controlling the controlled device 90 based on the generated electric power.

The identifying information access device 1' is provided with the electromagnetic wave generating antenna part 22, the resonance antenna part 80, and the non-contact control device 30. The electromagnetic wave generating antenna part 22 generates an electromagnetic wave.

The resonance antenna part 80 is formed to have no electrical contact with the electromagnetic wave generating antenna part 22. The resonance antenna part 80 has the resonance part 82. The resonance part 82 receives an electromagnetic wave emitted from the electromagnetic wave generating antenna part 22 and resonates with the received electromagnetic wave to emit a resonance electromagnetic wave.

The non-contact control device 30 is formed to have no electrical contact with both the electromagnetic wave generating antenna part 22 and the resonance antenna part 80. The non-contact control device 30 is formed integrally with the resonance antenna part 80. The non-contact control device 30 receives an electromagnetic wave generated by the resonance antenna part 80 to generate electric power, and controls the controlled device 90 based on the generated electric power. The non-contact control device 30 can be controlled by receiving an electromagnetic wave even if the non-contact control device 30 is not wired connected with the electromagnetic wave generating antenna part 22.

The non-contact control device 30 receives an electromagnetic wave to generate electric power, and controls the controlled device 90 based on the generated electric power, so that it is possible to read from and write in an RFID tag as well as control the controlled device 90 to operate. The non-contact control device 30 is formed integrally with the electromagnetic wave generating antenna part 22 and thus is not required to be assembled separately, so that the non-contact control device 30 can be easily manageable.

As shown in FIG. 1B, in the identifying information access device 1' according to an embodiment of the present invention, the non-contact control device 30 has an electromagnetic wave receiving antenna part 32 (such as the antenna 132) for receiving an electromagnetic wave generated by a resonance antenna part, and the electromagnetic wave receiving antenna part 32 is formed integrally with the resonance antenna part 80 on a antenna base plate.

The non-contact control device 30 receives an electromagnetic wave at the electromagnetic wave receiving antenna part 32 to generate electric power, and controls the controlled device 90 based on the generated electric power, so that it is possible to read from and write in an RFID tag as well as control the controlled device 90 to operate. The electromagnetic wave receiving antenna part 32 is formed integrally with the resonance antenna part 8 and thus is not required to be assembled separately, so that the electromagnetic wave receiving antenna part 32 can be easily manageable.

As shown in FIG. 1B, the identifying information access device 1' according to an embodiment of the present invention is further provided with a reading/writing control device 20 for controlling the reading and writing of the identifying information by supplying an RF signal to the electromagnetic wave generating antenna part 22, and the electromagnetic wave receiving antenna part 32 has no electrical contact with the reading/writing control device 20, the electromagnetic wave generating antenna part 22, and the resonance antenna part 80.

The electromagnetic wave receiving antenna part 32 has no electrical contact with the reading/writing control device 20, the electromagnetic wave generating antenna part 22, and the resonance antenna part 80, and thus can control the controlled device 90 without wiring for transmitting a control signal. Since any wiring is not necessary, the structure of the non-contact control device 30 can be simplified and the assembling process thereof can be easy. The non-contact control device 30 can be controlled by receiving an electromagnetic wave even if the non-contact control device 30 is not wired connected with the reading/writing control device 20 and the electromagnetic wave generating antenna part 22.

As shown in FIG. 1B, in the identifying information access device 1' according to an embodiment of the present invention, the resonance antenna part 80 generates an induced current based on the received electromagnetic wave emitted from the electromagnetic wave generating antenna part 22, and the non-contact control device 30 receives the electromagnetic wave emitted by the resonance antenna part 80 and generates an induced current to generate power. The power generated by the non-contact control device 30 makes it possible to supply power to each control device (via a terminal A and a terminal B shown in FIG. 5), and to drive a relay described below to carry out the ON/OFF control.

Since the controlled device 90 can be brought into ON state or OFF state based on the induced current, the controlled device 90 can be ON/OFF controlled without wiring for transmitting the control signal.

First Embodiment

FIG. 2 is a schematic diagram showing a structure of the identifying information access device according to a first embodiment. FIG. 2 shows an overview of an antenna 110 in particular. The identifying information access device 1 according to the first embodiment has an antenna device 100 and an RF reader/writer 200.

<<<Structure of Antenna Device 100>>>

The antenna device 100 is composed of the antenna 110 and an impedance matching circuit 120.

<<<Antenna 110>>>

The antenna 110 is intended to be used in HF band, which is a so-called loop antenna. The antenna 110 is made of a conducting wire made into a shape of ring (loop). The antenna 110 acts as a coil of a predetermined inductance. A magnetic-field component becomes predominant in the vicinity of the antenna 110. The antenna device 100 is electrically connected with an RF reader/writer 200 described below.

<<<Impedance Matching Circuit 120>>>

The impedance matching circuit 120 is a circuit which intends to match the impedance of the antenna 110 to that of the RF reader/writer 200 described below. For example, the impedance matching circuit 120 is configured by a circuit composed of passive components such as a capacitor, a coil, a resistor and the like. What is necessary is that the impedance matching circuit 120 actually is a circuit which intends to match the impedance of the antenna 110 to that of the RF reader/writer 200.

The antenna device 100 receives a modulating signal from a modulation part 222 of the RF reader/writer 200 described below and transmits it as a modulated wave to a gaming chip 400 (refer to FIG. 4). The antenna device 100 also receives a signal by a load modulation which is sent by the gaming chip 400 in response to a signal from the RF reader/writer 200, and supplies the modulated wave as a modulating signal to a demodulation part 224 of the RF reader/writer 200 described below.

<<<Structure of RF Reader/Writer 200>>>

Figure 3:
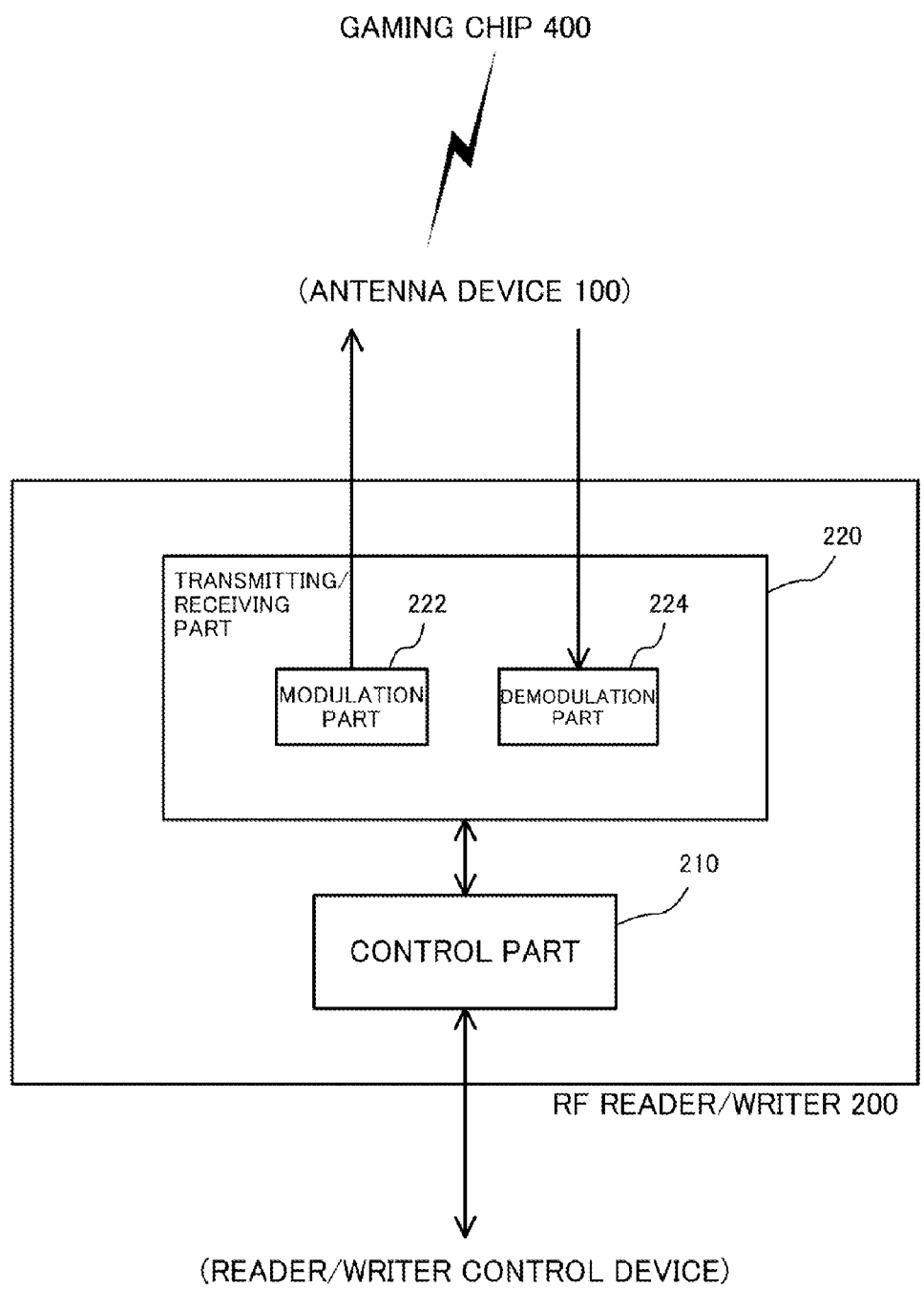
FIG. 3 is a block diagram showing a structure of an RF reader/writer 200.

FIG. 3 is a block diagram showing a structure of the RF reader/writer 200.

The RF reader/writer 200 is electrically connected to the antenna device 100. The RF reader/writer 200 can access an RFID IC tag 410 provided inside of the gaming chip 400 described below (refer to FIG. 4) via the antenna device 100. Specifically, the RF reader/writer 200 reads or writes a variety of information stored in the RFID IC tag 410 of the gaming chip 400 through a wireless communication using the antenna device 100.

The variety of information stored in the RFID IC tag 410 includes chip identifying information. The chip identifying information is the information for identifying the gaming chip 400 such as a chip ID (for example, an ID serial number). The RF reader/writer 200 can write desired information in the RFID IC tag 410 by using the RFID IC tag 410 which is rewritable. As described above, a variety of information can be stored in the RFID IC tag 410. The chip identifying information will be mainly explained below.

The RF reader/writer 200 has a control part 210 and a transmitting/receiving part 220. The transmitting/receiving part 220 is electrically connected to the control part 210. The control part 210 receives an instruction issued from a reader/writer control device (not shown). The control part 210 drives the transmitting/receiving part 220 in response to the received instruction.

The transmitting/receiving part 220 is driven by the control part 210 to read the chip identifying information issued from the gaming chip 400. The control part 210 transmits the read chip identifying information to the reader/writer control device. The control part 210 is composed of a microcomputer having CPU, ROM and RAM (not shown), for example.

The transmitting/receiving part 220 has a function for carrying out a wireless communication with the RFID IC tag 410 of the gaming chip 400 via the antenna device 100. The transmitting/receiving part 220 has the modulation part 222 and the demodulation part 224. The transmitting/receiving part 220 is composed of an RF module and the like having a modulation circuit and a demodulation circuit.

The modulation part 222 modulates a carrier wave in a predetermined modulation method based on information such as a predetermined command, request, instruction, etc. received from the control part 210, and then generates a modulated wave (a modulating signal) to output it as an RF signal. The output RF signal is applied to the antenna device 100 to be emitted as an electromagnetic wave from the antenna device 100.

The demodulation part 224 is supplied with the modulated wave received by the antenna device 100 as a modulating signal. The modulated wave is an electromagnetic wave in which a carrier wave is modulated in a predetermined modulation method based on a data stored in the RFID IC tag 410 in the gaming chip 400. The demodulation part 224 demodulates the modulating signal supplied from the antenna device 100, and fetches the data stored in the RFID IC tag 410 to pass the data to the control part 210. In this manner, the chip identifying information stored in the RFID IC tag 410 is passed to the control part 210.

As described above, since an electromagnetic wave is transmitted and received to and from the antenna device 100 by means of the RF reader/writer 200, it is possible to access the RFID IC tag 410 of the gaming chip 400 described below.
<<<Gaming Chip 400>>>

Figure 4:
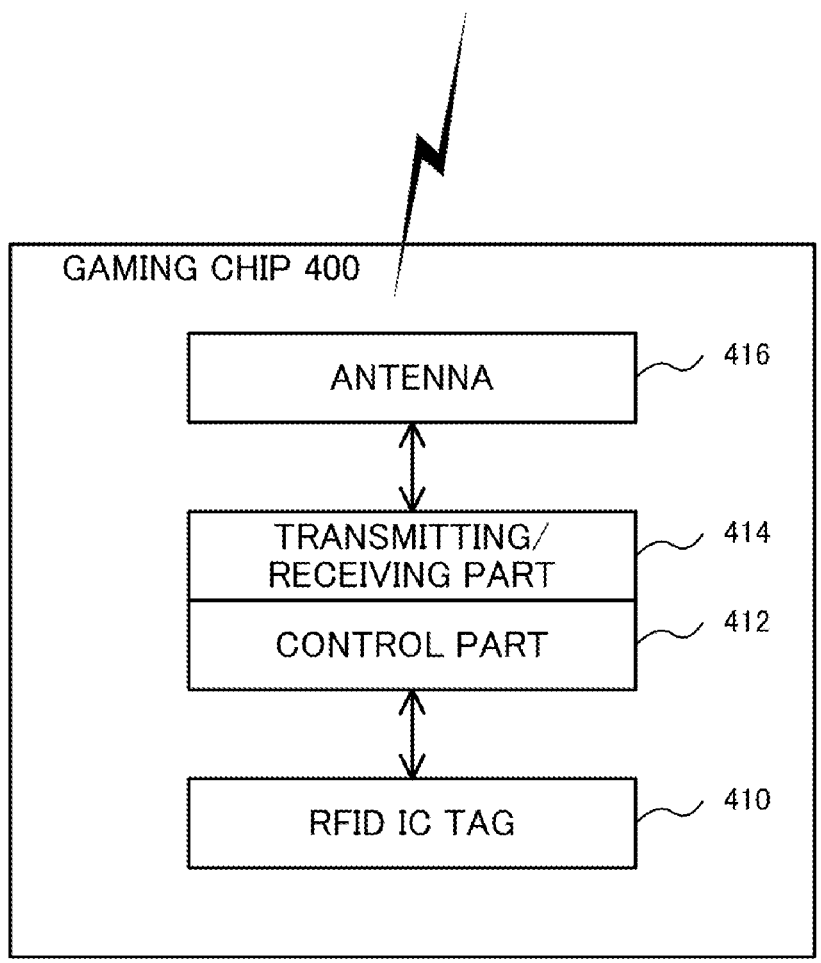
FIG. 4 is a block diagram showing a structure of a gaming chip 400.

FIG. 4 is a block diagram showing a structure of the gaming chip 400.

The gaming chip 400 is a gaming medium (a storage medium) which is exchanged between a dealer and a player instead of cash at a game hall such as a casino. The gaming chip 400 is generally a medium made of a resin molded in a shape of a disc, etc.

The gaming chip 400 has an RFID IC tag 410, a control part 412, a transmitting/receiving part 414, and an antenna 416.

The RFID IC tag 410 stores the chip identifying information that can be read out by a reading signal issued from the RF reader/writer 200. Furthermore, a variety of information can be written as desired by using a rewritable IC tag.

The control part 412 interprets a command, a request, an instruction and so on issued from the RF reader/writer 200 to execute the operation in response thereto. The transmitting/receiving part 414 has a modulation part (not shown) and a demodulation part (not shown). The transmitting/receiving part 414 modulates/demodulates the signal in order to wirelessly transmit/receive a variety of information such as a chip identifying information from/to the RF reader/writer 200.

The antenna 416 can receive a modulated wave from the antenna device 100 that is connected to the RF reader/writer 200.

When strength of an electromagnetic wave caused by a modulated wave from the antenna device 100 is a predetermined strength, an electromotive force can be produced which is necessary for driving the control part 412 and the transmitting/receiving part 414. The control part 412 and the transmitting/receiving part 414 are thus powered by the received modulated wave and resonance wave.

When the control part 412 and the transmitting/receiving part 414 are powered and driven by the received modulated wave and resonance wave, the transmitting/receiving part 414 generates a modulating signal representing information in accordance with a command, a request, and an instruction issued from the RF reader/writer 200, such as a chip identifying information. The antenna 416 receives the modulating signal generated by the transmitting/receiving part 414, and then transmits the modulated wave representing the chip identifying information. In HF, a communication by means of the load modulation is carried out in general from the gaming chip 400 (an IC chip) to the RF reader/writer 200.

The signal sent from the antenna 416 is received by the aforementioned antenna device 100, and then supplied to the RF reader/writer 200. In this manner, the RF reader/writer 200 can read the chip identifying information stored in the RFID IC tag 410.

The antenna 416 is also a so-called loop antenna in the HF band, which is the antenna made of a conducting wire made into a shape of ring (loop). A magnetic-field component becomes predominant in the vicinity of the antenna 110. In addition, a size of the antenna 416 of the gaming chip 400 is smaller than that of the antenna 110 of the antenna device 100. In this manner, an influence of the electromagnetic wave emitted from the antenna 416 can be reduced.
<ON/OFF Control Device 130>

As shown in FIG. 2, the antenna device 100 has the ON/OFF control device 130. The ON/OFF control device 130 is the device for controlling the ON/OFF operation of a switching element 150 described below (not shown).

The ON/OFF control device 130 has the antenna 132 and an ON/OFF control circuit 134. The switching element 150 is a relay element for carrying out the ON/OFF operation, for example. What is necessary is that the switching element 150 can be switch between ON and OFF states in response to the supplied control signal.
<Antenna 132>

As shown in FIG. 2, the antenna 132 has the structure similar to that of the antenna 110. The antenna 132 is also intended to be sued in the HF band, which is a so-called loop antenna. The antenna 132 is made of a conducting wire made into a shape of ring (loop). The antenna 132 acts as a coil of a predetermined inductance.

As shown in FIG. 2, the antenna 132 is not electrically connected to the antenna 110 and the RF reader/writer 200, unlike the antenna 110. More specifically, the antenna 132 is in a state of being insulated from the antenna 110 and the RF reader/writer 200. In other words, the antenna 132 is provided in the ON/OFF control device 130 so as to be kept in a state of having no contact with the antenna 110 and the RF reader/writer 200. Therefore, no RF signal is directly supplied from the RF reader/writer 200 to the antenna 132 via a wired signal line.

As shown in FIG. 2, the antenna 132 is arranged inside of the antenna 110. When an RF signal is supplied to the RF reader/writer 200, the antenna 110 causes a magnetic field of predetermined magnitude. In this case, the magnetic field caused by the antenna 110 is applied to the antenna 132. The antenna 132 then acts as a coil to generate an induced current by the applied magnetic field.

The antenna 132 is preferably arranged in the region of the substantially center of the antenna 110. The magnitude of the magnetic field generated by the antenna 110 is the largest in the region of the substantially center of the antenna 110. The antenna 132 arranged in the region of the substantially center of the antenna 110 enables the induced current generated at the antenna 132 to be larger.

<ON/OFF Control Circuit 134>

Figure 5:
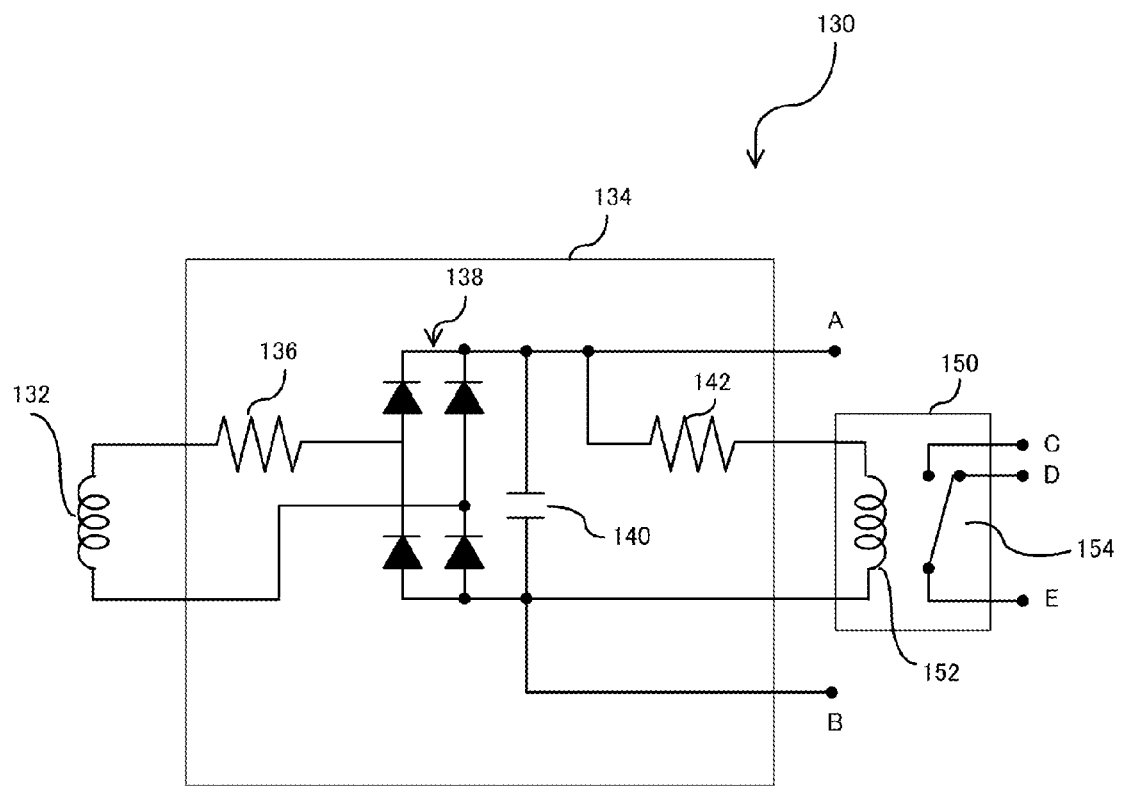
FIG. 5 is a diagram showing a specific structure of an ON/OFF control circuit 134 according to the first embodiment.

FIG. 5 is a diagram showing a specific structure of the ON/OFF control circuit 134. In addition, FIG. 5 shows the antenna 132 as a passive element coil 132. As shown in FIG. 5, the ON/OFF control circuit 134 is composed of a resistor 136, a diode bridge circuit 138, a capacitor 140, and a resistor 142.

The resistor 136 is connected in series to the antenna 132. The resistor 136 converts a current generated utilizing the antenna 132 as a coil into a desired voltage. A resistance value of the resistor 136 may be appropriately determined in response to a current value generated by the antenna 132, power required for driving the switching element 150, etc. A converted voltage is produced between both the ends of the resistor 136. As mentioned above, the antenna 132 causes the induced current upon supplying the RF signal to the RF reader/writer 200. The induced current is an alternating current, and the voltage converted by the resistor 136 is also an AC voltage.

The switching element 150 is often controlled by a DC voltage. As mentioned above, the voltage converted by the resistor 136 is also an AC voltage, so that it is necessary to convert it into a DC voltage. The conversion thereof into a DC voltage is carried out by the diode bridge circuit 138 and the capacitor 140 shown in FIG. 5. The diode bridge circuit 138 is a bridge circuit composed of four diodes. The diode bridge circuit 138 rectifies the voltage converted by the resistor 136. An output terminal of the diode bridge circuit 138 is connected in parallel with the capacitor 140. The capacitor 140 shapes the waveform of the voltage rectified by the diode bridge 138 so as to convert it into a DC voltage.

As mentioned above, when an RF signal is output from the RF reader/writer 200, a magnetic field is generated from the antenna device 100. The antenna 132 of the ON/OFF control device 130 acts as a coil to generate an induced current by the magnetic field generated by the antenna device 100. The induced current is converted into a DC voltage by the ON/OFF control circuit 134. The DC voltage converted by the ON/OFF control circuit 134 is supplied to the switching element 150. Furthermore, the DC voltage can be taken out from between the terminals A and B shown in FIG. 5 while an electromagnetic wave is sent out from the antenna device 100, so that it is possible to drive a small-sized circuit that requires little power.

More specifically, when the RF signal is output from the RF reader/writer 200, a voltage having a predetermined voltage value is supplied to the switching element 150. Furthermore, when the RF signal is not output from the RF reader/writer 200, a voltage value of the voltage supplied to the switching element 150 becomes zero. In this manner, the switching element 150 can be ON/OFF controlled in synchronization with the RF signal from the RF reader/writer 200. In addition, connecting a terminal C to a terminal E shown in FIG. 5 makes it possible to carry out the control for turning the switch ON upon supplying the power, and connecting a terminal D to a terminal E makes it possible to carry out the control for turning the switch OFF upon supplying the power.

The ON/OFF operation of the switching element 150 may be appropriately determined in response to the operation of the control device which executes the control by the switching element 150. For example, in response to the operation of the control device which is controlled by the switching element 150, the control device may be appropriately selected which goes into the ON state upon supplying the voltage to the switching element 150 and goes into the OFF state upon supplying no voltage to the switching element, or which goes into the OFF state upon supplying the voltage to the switching element 150 and goes into the ON state upon supplying no voltage to the switching element.

Although the present embodiment exemplifies the case of conversion into the direct current by the diode bridge circuit 138 and the capacitor 140, the other elements may be used to execute the AC/DC conversion. Furthermore, although the present embodiment exemplifies the case of the DC conversion for controlling the switching element 150 that executes ON/OFF operation, it is not necessary to execute the AC conversion if a device which can be controlled on AC is used. In this case, a circuit for converting a frequency and the like can be used.

<Switching Element 150>

As mentioned above, the switching element 250 executes the ON/OFF operation in the present embodiment. For example, a relay element and the like can be used as the switching element 150. The switching element 150 includes a coil 152, and a switch 154 that operates in response to a magnetic field generated by the coil 152. The switch 154 goes into the ON state upon supplying a voltage having a predetermined voltage value to the coil 152. The switch 154 goes into the OFF state upon not supplying a voltage having a predetermined voltage value to the coil 152.

The switching element 150 is connected with a controlled device (not shown) that is ON/OFF controlled by the switching element 150. The controlled device can be turned on and off by bringing the switch 154 into ON state or OFF state. For example, if a relay is used as the switching element 150, the controlled device to be connected can be switched to be turned on and off based on the generated magnetic field, and switched to be short-circuited and opened.

What is necessary is that the controlled device that is controlled by the switching element 150 can be ON/OFF controlled.

<Antenna for Demagnetizing Field 160>

As shown in FIG. 2, the antenna device 100 is provided with an antenna for demagnetizing field generation 160. The antenna for demagnetizing field generation 160 is provided for generating a demagnetizing field in order to cancel the magnetic field generated by the antenna device 100. For example, in a case where a plurality of antenna devices 100 is arranged adjacent to one another, it can be envisaged that the magnetic field generated by the antennas 110 of the antenna device 100 arranged therearound have an influence thereon. In order to reduce the influence by such a magnetic field, the antenna for demagnetizing field generation 160 can generate a demagnetizing field to cancel the magnetic field generated by the antennas 110 of the antenna device 100 arranged therearound. As shown in FIG. 2, in the antenna for demagnetizing field generation 160, the antennas 110 are located outside of the antenna 110 so as to surround the antenna 110.

Although FIG. 2 shows the case in which the antenna for demagnetizing field geneneration 160 is provided integrally with the antenna device 100, the antenna for demagnetizing field geneneration 160 may be provided separate from the antenna device 100. Furthermore, the antenna for demagnetizing field geneation 160 and the antennas 100 of the antenna device 100 may be provided to be located not on a single plane, but on different planes. In particular, it is preferable that the antenna for demagnetizing field generation 160 is provided to be superimposed on the antennas 110. The antenna for demagnetizing field generation 160 and the antennas 100 are provided to be superimposed on one another, so that the magnetic field which has the influence on the antennas 110 of the antenna device 100 can be adequately canceled. The operation of the antenna for demagnetizing field generation 160 upon arranging the plurality of antenna devices 100 will be described in detail below.

The example of the antenna device 100 shown in FIG. 2 includes the antenna 110, the antenna 132, the ON/OFF control circuit 134, and the antenna for demagnetizing field generation 160, all of which are integrally provided on an antenna base plate (not shown). The structure is, however, not limited to this, but only the antenna 110 and the antenna 132 may be provided integrally on the antenna base plate. Furthermore, the antenna 110, the antenna 132, and the ON/OFF control circuit 134 may be provided integrally on the antenna base plate. This enables the handling and the assembling process to be simplified, thereby making it possible to simplify the wiring process.

The antenna base plate is a base plate such as a glass epoxy board having an antenna pattern (a conductor pattern) made of a conducting material formed thereon. The conductor patterns of, for example, the antenna 110, the antenna 132, the antenna for demagnetizing field generation 160, and the ON/OFF control circuit 134 can be formed in a manner that they are integral as well as insulated with one another by etching and the like. Since a variety of conductor patterns can be formed together including the antenna, the manufacturing process as well as the assembling process can be simplified.

In addition, the example described above has shown the case where a variety of antennas is formed integrally on the base plate. In contrast, the antenna 110, the antenna 132, the antenna for demagnetizing field generation 160, etc. are not necessarily formed integrally on a single member such as a base plate. What is necessary is that they are fixedly provided so that the positions of the antennas relative to one another are not changed.

<<Arrangement of Antenna Device 100>>

Figure 6:
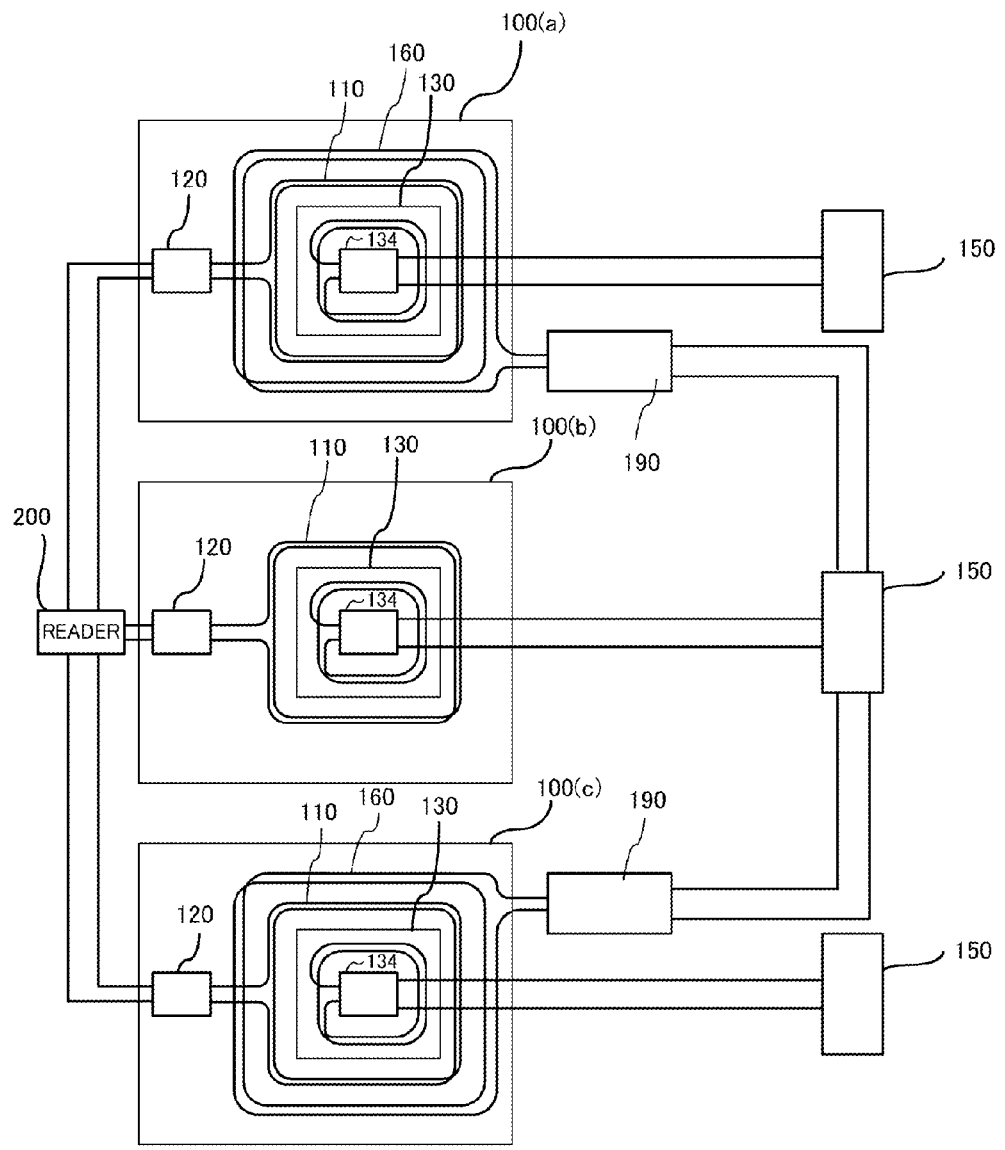
FIG. 6 is a schematic diagram showing a structure upon using a plurality of antenna devices 100 according to the first embodiment.
Figure 11A:
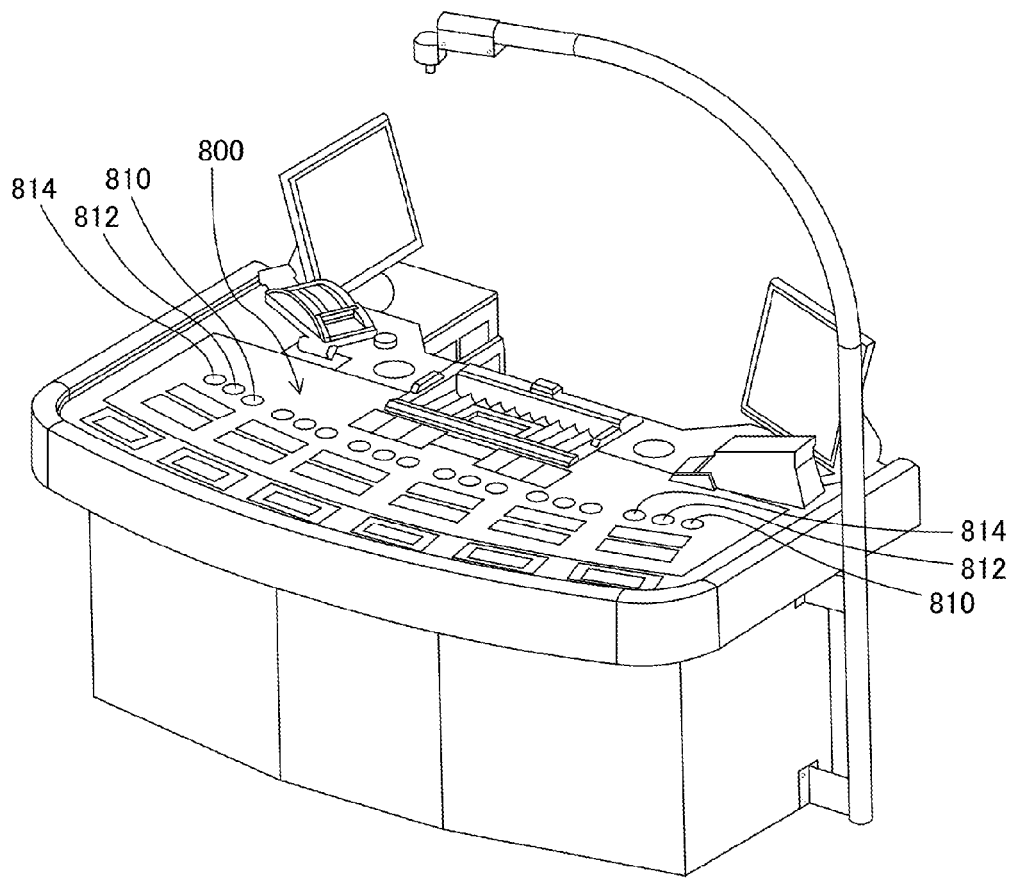
FIG. 11A is a perspective view showing an overview of a casino table.
Figure 11B:
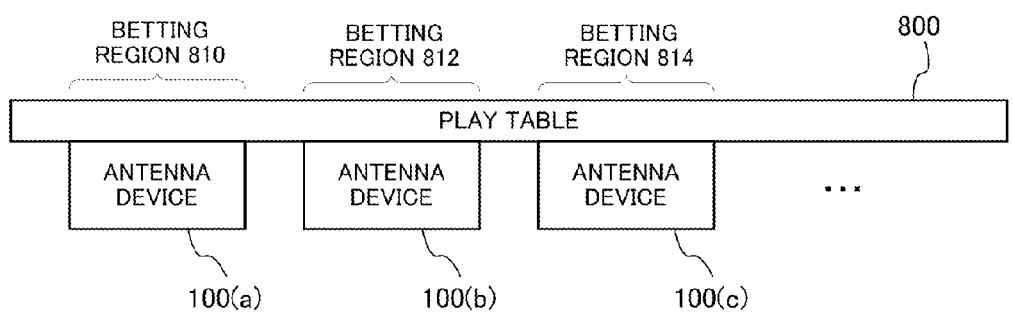
FIG. 11B is a cross sectional view showing an overview of the arrangement of a plurality of antenna devices 100.

FIG. 6 is a schematic diagram showing a structure upon using a plurality of antenna devices 100. For example, as shown in FIG. 11A, a plurality of betting regions 810, 812 and 814 are formed to be adjacent to one another on a bet table 800 which is placed in a game hall such as a casino. As shown in FIG. 11B, the antenna devices 100 are provided under each of the plurality of betting regions 810, 812 and 814. FIG. 11B is a diagram showing a cross section of the bet table 800, and is a diagram showing an overview of the arrangement of the plurality of betting regions 810, 812, and 814, and the antenna devices 100 corresponding to the betting regions. For example, antenna devices 100(a), 100(b) and 100(c) are provided on the underside of the bet table 800 in a manner that they correspond to the betting regions 810, 812 and 814.

The example shown in FIG. 6 shows the structure in which a single RF reader/writer 200 is connected with the plurality of antenna devices 100. Each of three antenna devices 100 explicitly shown in FIG. 6 is referred to as the antenna devices 100(a), 100(b) and 100(c). In addition, the RF reader/writer 200 shown in FIG. 6 has a switching device (not shown) incorporated therein, by which the RF reader/writer 200 can switch the plurality of antenna devices 100 to read/write in sequence. For example, the RF reader/writer 200 executes the switching sequence in the order of, for example, the antenna device 100(a), the antenna device 100(b), the antenna device 100(c) . . . , and then carries out the reading/writing of the RFID tag of the corresponding gaming chip 400.

As mentioned above, the RF reader/writer 200 reads/writes by switching the he plurality of antenna devices 100 to read/write in sequence. For example, when the antenna device 100(b) is used to read from and write in the gaming chip 400, the antenna device 100(b) is electrically connected to the RF reader/writer 200 by the switching device, and no electrical connection is established between the antenna devices 100 other than the antenna device 100(b) and the RF reader/writer 200.

The RF signal is supplied to the antenna device 100(b) while the antenna device 100(b) is electrically connected to the RF reader/writer 200. The antenna device 100(b) causes the magnetic field by the supplied RF signal. If the magnetic field is weak, the magnetic field is generated only in the vicinity of the antenna 100(b). Therefore, the magnetic field generated by the antenna device 100(b) becomes weak in a region covered by the antenna devices 100(a) and 100(c).

In the present embodiment, the region covered by the antenna device 100(a) is the region in which the gaming chip 400 to be read and written by the antenna device 100(a) is arranged, such as the first betting region 810 on the bet table 800 described above. A groove 640 of a chip tray 610 described below may be also used.

Likewise, the region covered by the antenna device 100(b) is the region in which the gaming chip 400 to be read and written by the antenna device 100(b) is arranged, such as the second betting region 812 on the bet table 800 described above. A groove 640 of a chip tray 610 described below may be also used.

Furthermore, the region covered by the antenna device 100(c) is the region in which the gaming chip 400 to be read and written by the antenna device 100(c) is arranged, such as the third betting region 814 on the bet table 800 described above. A groove 640 of a chip tray 610 described below may be also used.

Figure 12:
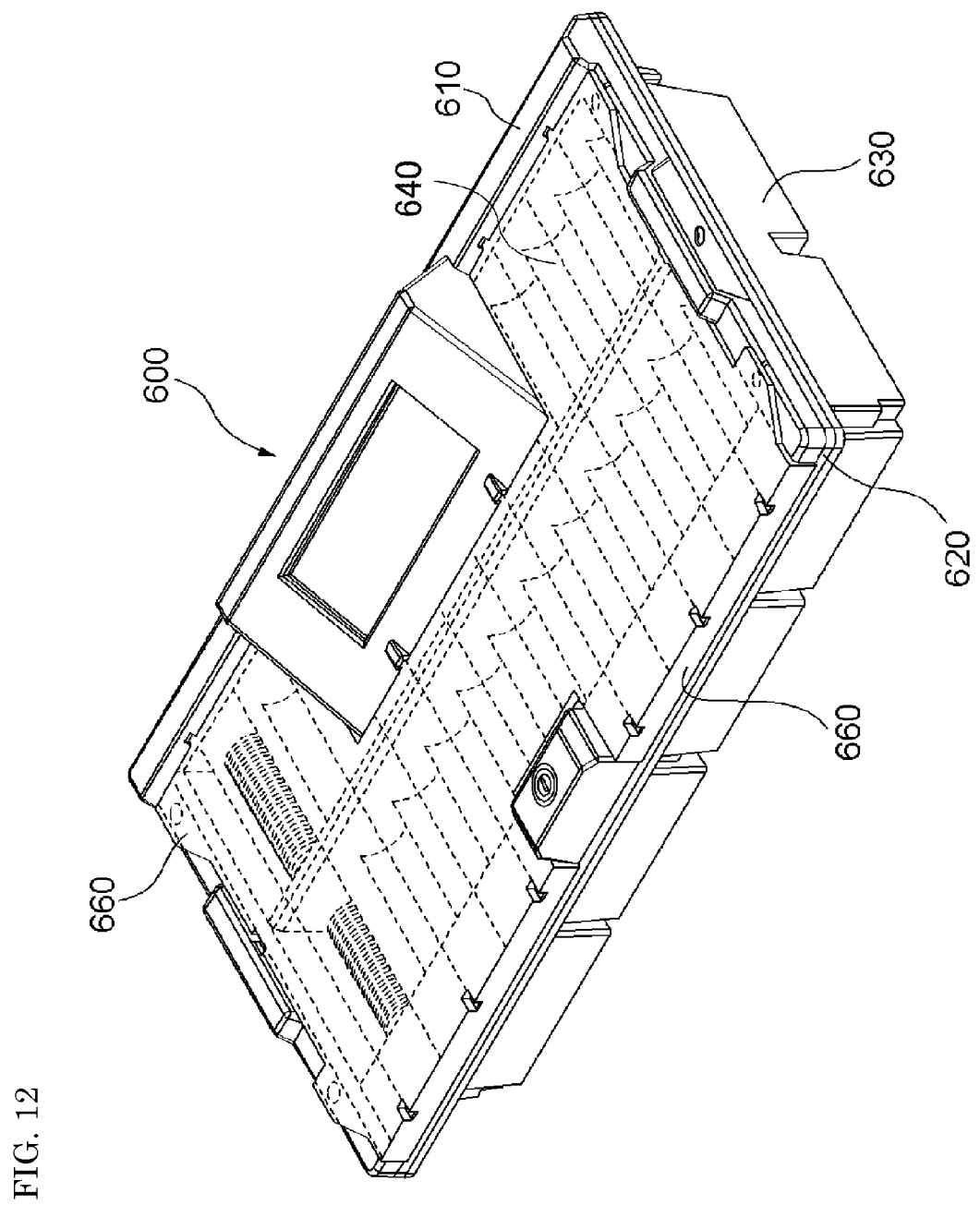
FIG. 12 is a perspective view showing a chip tray structure 600.

FIG. 12 is a perspective view showing a chip tray structure 600. The chip tray structure 600 has a three-layer structure composed of a chip tray 610, a base plate cover 620, and a base 630. Furthermore, a lid body 660 is provided for covering the top of the chip tray 610. The lid body 660 can be locked with the chip tray 610.

The groove 640 for accommodating the gaming chip 400 is formed on the chip tray 610. In the example shown in FIG. 12, 18 grooves 640 are formed. A plurality of, for example 50, gaming chips 400 can be accommodated in a single groove 640. End portions are formed opposite to each other at the farthest positions in the longitudinal direction of each of the grooves 640. The antenna devices 100 are provided on the end portion, so that the chip identifying information of the gaming chips 400 accommodated in each of the grooves 640 can be read.

As mentioned above, even if the gaming chips 400 are arranged in regions covered by the antenna devices 100(a) and 100(c), the RFID IC tags 410 of the gaming chips 400 arranged in the regions of interest (such as the first betting region 810 and the third betting region 814) are not read out when the magnetic field generated by the antenna 100(b) is weak.

In contrast, when the magnetic field generated by the antenna device 100(b) is strong, the magnetic field is formed in the region away from the antenna device 100(b). Therefore, the magnetic field generated by the antenna device 100(b) becomes strong even in the regions covered by the antenna devices 100(a) and 100(c). Thus, the gaming chip 400s arranged in the regions covered by the antenna device 100(a) and 100(c) (such as the first betting region 810 and the third betting region 814) increase the likelihood of reading out the RFID IC tags 410 of the gaming chips 400 arranged in those regions by the antenna device 100(b).

Therefore, the antenna 100(b) may read out the RFID IC tags 410 of the gaming chips 400 arranged not only in the region covered by the antenna device 100(b) (such as the second betting region 812), but also the regions covered by the antenna devices 100(a) and 100(c) (such as the first betting region 810 and the third betting region 814). In such a case, a betting is erroneously judged, which is more likely to be disadvantageous to not only a player but a game hall.

As mentioned above, it is preferable that the magnetic field generated by the antenna device 100(b) is weak because it reduces the likelihood of erroneous identification, whereas the problem may occur in which it is difficult to properly read out the RFID IC tags 410 of the gaming chips 400 arranged in the regions of interest originally of the antenna device 100(b). For example, when the plurliary of gaming chips 400 are stacked and arranged in the second betting region 812, the magnetic field becomes weaker with distance from the antenna device 100(b). Therefore, the RFID IC tags 410 of the gaming chips 400 positioned away from the antenna device 100(b) may potentially be difficult to be read out properly.

Accordingly, the identifying information access device has been desired in which the antenna device 100 can read out the RFID IC tags 410 of the gaming chips 400 arranged in the regions of interest originally thereof, and also cannot read out the RFID IC tags 410 of the gaming chips 400 which is not arranged in the regions of interest originally thereof.

In the example shown in FIG. 6, the switching element 150 of the antenna device 100(b) is connected to an antenna for demagnetizing field generation 160 of the antenna device 100(a) and an antenna for demagnetizing field generation 160 of the antenna device 100(b) via the controlled circuit 190. In addition, FIG. 6 shows the switching element 150 being simplified as a rectangular.

As mentioned above, the RF signal is supplied to the antenna device 100(b) while the antenna device 100(b) is electrically connected to the RF reader/writer 200. The antenna device 100(b) generates the magnetic field by the supplied RF signal. When the magnetic field generated by the antenna device 100(b) is strong, the magnetic field is applied to the antenna 132 of the ON/OFF control device 130 of the antenna device 100(b). The antenna 132 of the ON/OFF control device 130 of the antenna device 100(b) acts as a coil to generate an induced current by the applied magnetic field. A DC voltage based on the induced current is supplied to the switching element 150 of the antenna device 100(b). Thus, the switching element 150 of the antenna device 100(b) goes into ON state when the voltage is supplied thereto, and the controlled circuit 190 is brought into ON state. The controlled circuit 190 going into ON state makes the antenna for demagnetizing field generation 160 of the antenna device 100(a) and the antenna for demagnetizing field generation 160 of the antenna device 100(b) receive the supply of the induced current due to the magnetic field emitted from the antenna 110 of the antenna device 100(b). Each of the antenna for demagnetizing field generation 160 of the antenna device 100(a) and the antenna for demagnetizing field generation 160 of the antenna device 100(c) generates a predetermined magnetic field by the supplied induced current.

The antenna for demagnetizing field generation 160 is formed so that the orientation of the magnetic field generated by the antenna for demagnetizing field generation 160 of the antenna device 100(a) is opposite to that of the magnetic field generated by the antenna for demagnetizing field generation 160 of the antenna device 100(b) in the region covered by the antenna device 100(a). Moreover, the antenna for demagnetizing field generation 160 is formed so that the magnetic field generated by the antenna for demagnetizing field generation 160 of the antenna device 100(a) cancels the magnetic field generated by the antenna 110 of the antenna device 100(b) in the region covered by the antenna device 100(a). In such a manner, it is possible to cancel a part of the magnetic field generated by the antenna 100 of the antenna device 100(b) which reaches the region of the antenna 100(a).

Likewise, the antenna for demagnetizing field generation 160 is formed so that the orientation of the magnetic field generated by the antenna for demagnetizing field generation 160 of the antenna device 100(c) is opposite to that of the magnetic field generated by the antenna for demagnetizing field generation 160 of the antenna device 100(b) in the region covered by the antenna device 100(c). Moreover, the antenna for demagnetizing field generation 160 is formed so that the magnetic field generated by the antenna for demagnetizing field generation 160 of the antenna device 100(c) cancels the magnetic field generated by the antenna 110 of the antenna device 100(b) in the region covered by the antenna device 100(c). In such a manner, it is possible to cancel a part of the magnetic field generated by the antenna 100 of the antenna device 100(b) which reaches the region of the antenna 100(c).

In contrast, the RF signal is supplied to the antenna device 100(b) while the antenna device 100(b) is not electrically connected to the RF reader/writer 200. In this case, the antenna device 100(b) does not generate the magnetic field and no induced current is generated by the antenna device 100(b). Therefore, the switching element 150 is not supplied with the voltage and goes into OFF state. Thus, the antenna for demagnetizing field generation 160 of the antenna device 100(a) and the antenna for demagnetizing field generation 160 of the antenna device 100(b) do not operate together.

As described above, when the antenna device 100(b) is electrically connected to the RF reader/writer 200, it is possible to generate the magnetic field by the antenna 110 of the antenna device 100(b), as well as generate the magnetic field by the antennas for demagnetizing field generation 160 of the antenna device 100(a) and the antenna device 100(c). Furthermore, when the electrical connection is terminated between the antenna device 100(b) and the RF reader/writer 200, it is possible to extinguish the magnetic field by the antenna 110 of the antenna device 100(b), as well as extinguish the magnetic field by the antennas for demagnetizing field generation 160 of the antenna device 100(a) and the antenna device 100(c). Therefore, the generation and extinguishment of the magnetic field by the antenna for demagnetizing field generation 160 can be carried out simultaneously with the generation and extinguishment of the magnetic field by the antenna 110 by means of the control of the RF reader/writer 200.

In particular, the antenna for demagnetizing field generation 160 is controlled by the induced current generated by the antenna 132. More specifically, the antenna 132 is in a state of being insulated from the antenna 110 and the RF reader/writer 200. In other words, the antenna 132 and the switching element 150 have the structure in which they are not electrically connected to the RF reader/writer 200 by a signal line and the like. In spite of the aforementioned structure, the control of the RF reader/writer 200 makes it possible to control not only the generation and extinguishment of the magnetic field by the antenna 110, but the generation and extinguishment of the magnetic field by the antenna for demagnetizing field generation 160. As described above, in accordance with the antenna device 100 of the present embodiment, ON state and OFF state of the antenna for demagnetizing field generation 160 can be controlled without electrically connecting the antenna 132 and the switching element 150 to the RF reader/writer 200.

In this manner, the antenna 132 and the switching element 150 which are not electrically connected are controlled by the control by the RF reader/writer 200, so that it is possible to carry out the control of the generation and extinguishment of the magnetic field by the antenna 110 simultaneously with that of the generation and extinguishment of the magnetic field by the antenna for demagnetizing field generation 160. The control of the generation and extinguishment of the magnetic field by the antenna 110 can be easy while simplifying the structure of the antenna device 100.

Although the example described above exemplifies the case where the antenna for demagnetizing field generation 160 is connected to the controlled circuit 190 to control the magnetic field generated from the antenna for demagnetizing field generation 160, the controlled circuit 190 may be connected with other devices to carry out the control. For example, an illumination device such as an LED can be connected, and the controlled device 190 can be controlled by the switching element 150, thereby controlling the lighting and flashing of the LED.

<<ON/OFF Control Device 170>>

Figure 7:
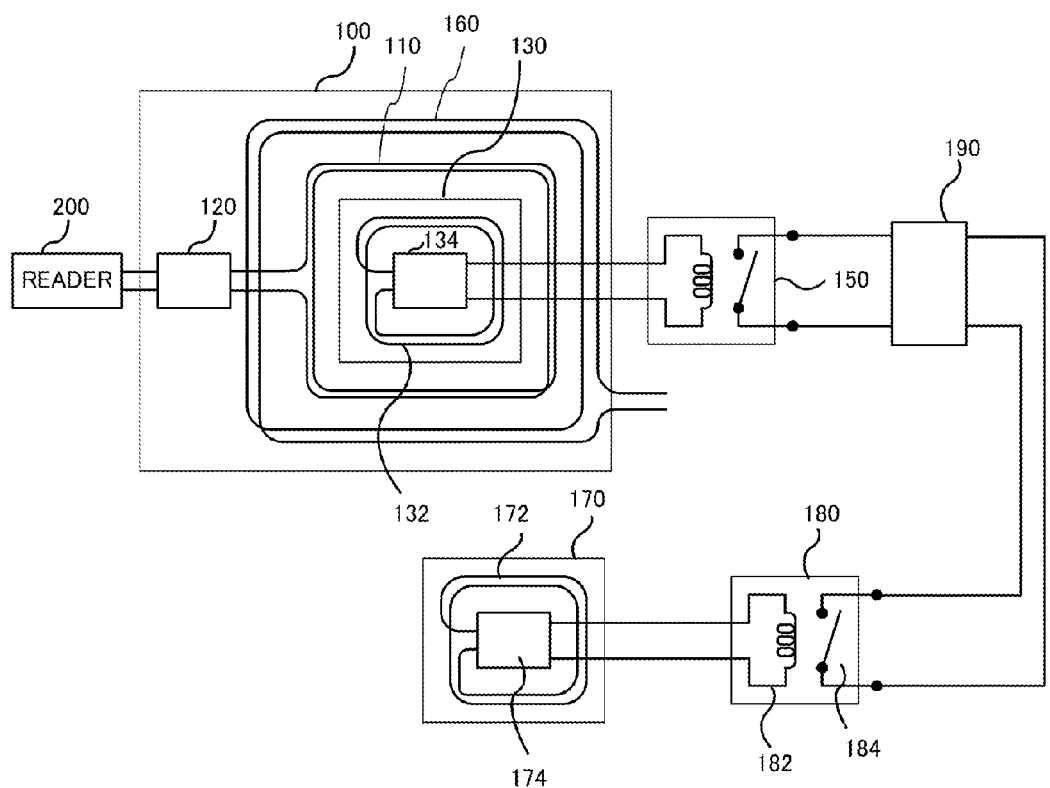
FIG. 7 is a diagram showing a structure in which the plurality of identifying information access devices according to the first embodiment is connected with other ON/OFF control device 170.

The example shown in FIG. 7 shows the structure which has other ON/OFF control device 170 than the ON/OFF control device 130 provided on the antenna device 100. In the example shown in FIG. 7, the ON/OFF control device 170 controls a switching element 180. A control device that is controlled by the switching element 180 is referred to as a controlled circuit 190. The controlled circuit 190 is electrically connected with the ON/OFF control device 130, and also is electrically connected with the ON/OFF control device 170. The controlled circuit 190 is controlled by both the ON/OFF control device 130 and the ON/OFF control device 170.

Similar to the ON/OFF control device 130, the ON/OFF control device 170 also has an antenna 172 and an ON/OFF control circuit 174. The switching element 180 is a relay element, etc., which carries out the ON/OFF operation, for example. What is necessary is that the switching element 180 can switch the ON/OFF states in response to the supplied control signal.

<Antenna 172>

The antenna 172 may have the structure similar to that of the antenna 132, namely may be a so-called loop antenna. In that case, however, a frequency used by the antenna 172 must differ from a frequency used by the antenna 132. Furthermore, the antenna 172 may utilize not only HF, but another frequency bands such as UHF band. In this manner, an electromagnetic wave is generated at the antenna device 100, and the electromagnetic wave of another frequency is used to receive it at the antenna 172 while the ON/OFF control device 130 is driven, thereby enabling the switching element 180 to be switched. The controlled circuit 190 thus can be controlled in detail. During that time, the antenna device 100 keeps transmitting the electromagnetic wave, and the DC output can be taken out from the terminal A in FIG. 5. It is thus possible to supply it to the antenna 172 as the DC power source to simultaneously drive a high-frequency receiving circuit with the ON/OFF control circuit.

For example, in a case where the plurality of antenna devices 100 is provided, a magnetic field is generated by the antenna 110 of a single antenna device 100. The strength of the magnetic field generated by the antenna for demagnetizing field generation 160 is determined by the strength of the induced current generated at the antennas for demagnetizing field generation 160 in the magnetic field caused by the antenna 110. Therefore, the magnetic field generated at the antennas for demagnetizing field generation 160 becomes stronger if the magnetic field produced by the antenna 110 is strong, while the magnetic field generated at the antennas for demagnetizing field generation 160 becomes weaker if the magnetic field produced by the antenna 110 is weak. Thus, the magnetic field on the antenna 160 can be canceled irrespective of the strength of the electromagnetic wave sent out from the antenna 110. Since the IC tag 410 of the gaming chip 400 is not activated and does not operate if the strength of the magnetic field becomes weak, the magnetic field strength is not necessarily set to be zero precisely. What is necessary is that the magnetic field strength in the unnecessary place is controlled to reach the level in which the IC tag 410 does not operate.

More specifically, when the electromagnetic wave is output from the antenna 110 in FIG. 6, a strong magnetic field occurs in the vicinity of the antenna 110. The antenna for demagnetizing field generation 160, which is arranged in the vicinity of the antenna 110, is heavily influenced by the magnetic field. At the same time, the ON/OFF control device 150 supplies an ON/OFF signal and a DC power source to cause a short in the controlled circuit 190. As described above, the antenna for demagnetizing field generation 160 constitutes a loop to receive the strong magnetic field emitted from the antenna 110, and thus the strong induced current flows to the antenna for demagnetizing field generation 160. Since the direction of the induced current flowing at that time is opposite to that of the current flowing to the antenna 110, the magnetic field generated by the induced current flowing to the antenna for demagnetizing field generation 160 is generated in the direction of canceling the magnetic field generated by the antenna 110. Furthermore, when the antenna 110 generates a weak magnetic field, the induced current caused thereby is weak; when the antenna generates a strong magnetic field, the induced current caused thereby is strong. In this manner, it is possible to read the necessary part of the IC tag at the antenna 110, and not to read the IC tag positioned at the antenna for demagnetizing field generation 160.

As described above, since a plurality of ON/OFF control devices 170 is provided, the controlled circuit 190 can be controlled in detail by switching the ON/OFF state of each of the plurality of ON/OFF control devices 170 while keeping the controlled circuit 190 of the switching element 180 in the ON state.

As mentioned above, the controlled circuit 190 may be controlled by connecting with an illumination device such as an LED. Brightness of the LED can be changed in order by switching the ON/OFF state of each of the plurality of ON/OFF control devices 170. Furthermore, when a plurality of kinds of LEDs is connected to the controlled circuit 190, color of light emission can be switched. The output of the terminal A in FIG. 5 described above can be used as a DC power source of the circuit for lighting the LEDs.

The antenna 172 is also different from the antenna 110, similar to the antenna 132. Although not electrically connected with the antenna 110 and the RF reader/writer 200, the antenna 172 may utilize the DC power source obtained from the ON/OFF control device 130. Furthermore, the antenna 172 is electrically connected to neither the antenna 132 nor the switching element 150.

More specifically, the antenna 172 is also insulated from the antenna 110 and the RF reader/writer 200. In other words, the antenna 172 is provided in the ON/OFF control device 170 so as to be kept in a state of having no contact with the antenna 110 and the RF reader/writer 200. Therefore, no RF signal is directly supplied from the RF reader/writer 200 to the antenna 172 via a signal line.

<ON/OFF Control Circuit 174>

When using the HF band, the ON/OFF control circuit 174 may have the structure similar to that of the ON/OFF control circuit 134 shown in FIG. 5. When a magnetic field is applied from a driving coil (not shown) to the antenna 172 of the ON/OFF control circuit 174, the antenna 172 of the ON/OFF control circuit 174 acts as a coil to generate an induced current. The induced current is converted into a DC voltage by the ON/OFF control circuit 174. The DC voltage converted by the ON/OFF control circuit 174 is supplied to the switching element 180. Also in this case, however, the frequency of the electromagnetic wave supplied to the antenna 172 differs from the frequency of the electromagnetic wave generated at the antenna 110.

More specifically, when the magnetic field is applied to the antenna 172 of the ON/OFF control circuit 174, a voltage having a predetermined value is supplied to the switching element 180. Furthermore, when the magnetic field is not applied to the antenna 172 of the ON/OFF control circuit 174, a voltage value of the voltage supplied to the switching element 180 becomes zero.

Similar to the switching element 150, the ON/OFF operation of the switching element 180 may be appropriately determined in response to the operation of the control device which executes the control by the switching element 180. For example, in response to the operation of the control device which executes the control by the switching element 180, the control device may be appropriately selected which goes into the ON state upon supplying the voltage to the switching element 180 and goes into the OFF state upon supplying no voltage to the switching element, or which goes into the OFF state upon supplying the voltage to the switching element 180 and goes into the ON state upon supplying no voltage to the switching element.

<Switching Element 180>

As mentioned above, the switching element 180 executes the ON/OFF operation in the present embodiment. For example, a relay element and the like can be used as the switching element 180. The switching element 180 includes a coil 182, and a switch 184 that operates in response to a magnetic field generated by the coil 182. The switch 184 goes into the ON state upon supplying a voltage having a predetermined voltage value to the coil 182. The switch 184 goes into the OFF state upon not supplying a voltage having a predetermined voltage value to the coil 182. Furthermore, the switch 184 can be brought into the OFF state when no voltage having a predetermined voltage value is supplied to the coil 182, whereas the switch can be brought into the ON state when no predetermined voltage is supplied to the coil as shown in FIG. 5.

Second Embodiment

Figure 8:
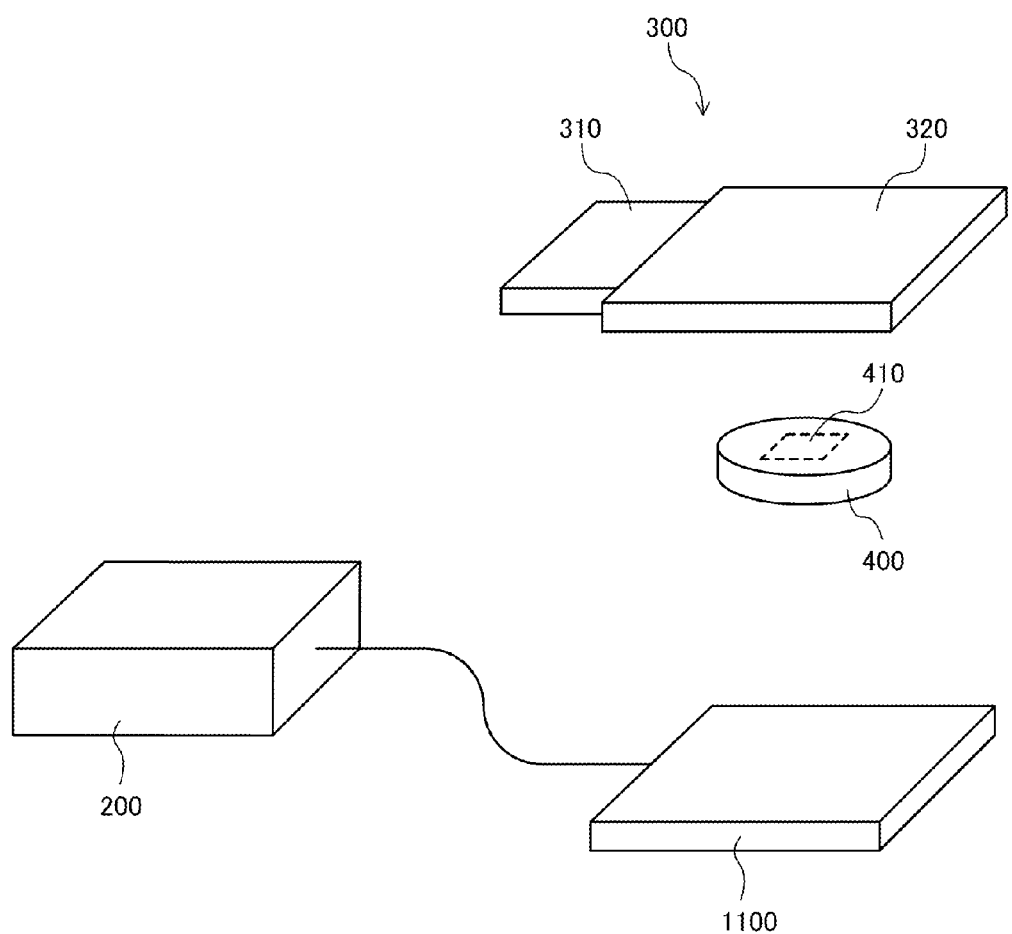
FIG. 8 is a schematic diagram showing a structure of an identifying information access device according to a second embodiment.

FIG. 8 is a schematic diagram showing a structure of an identifying information access device according to a second embodiment. The identifying information access device according to the second embodiment has a second antenna device 300 in addition to a first antenna device 1100 and the RF reader/writer 200. The RF reader/writer 200 has the same structure as the RF reader/writer 200 in the identifying information access device according to the first embodiment (refer to FIG. 3). Furthermore, the gaming chip 400 also has the same structure as the gaming chip 400 in the identifying information access device according to the first embodiment (refer to FIG. 4).

FIG. 9 is a diagram showing a structure of the first antenna device 1100 and the second antenna device 300. In addition, with regard to the structure of the first antenna device 1100 and the second antenna device 300, like reference numerals refer to like parts of the antenna device 100 in the identifying information access device of the first embodiment.

<<First Antenna Device 1100>>

The first antenna device 1100 is composed of an antenna 1110. The antenna 1110 is also intended to be used in HF band, which is a so-called loop antenna. The antenna 1110 is made of a conducting wire made into a shape of ring (loop). The antenna 1110 also acts as a coil of a predetermined inductance. A magnetic-field component becomes predominant in the vicinity of the antenna 1110. The first antenna device 1100 is electrically connected with the RF reader/writer 200.

Similar to the antenna device 100 in the first embodiment, the first antenna device 1100 receives a modulating signal from the modulation part 222 of the RF reader/writer 200 and transmits it as a modulated wave to the gaming chip 400. The first antenna device 1100 also receives a signal sent from the gaming chip 400, and supplies the modulated wave as a modulating signal to the demodulation part 224 of the RF reader/writer 200 described below.

In addition, the antenna device 100 of the first embodiment is provided with the ON/OFF control device 130, whereas the antenna device 1100 of the second embodiment is not provided with the ON/OFF control device 130. As mentioned above, the ON/OFF control device 130 is provided in the second antenna device 300 in the second embodiment.

<<Second Antenna Device 300>>

The second antenna device 300 has a resonance device 310.

<<Structure of Resonance Device 310>>

Figure 10:
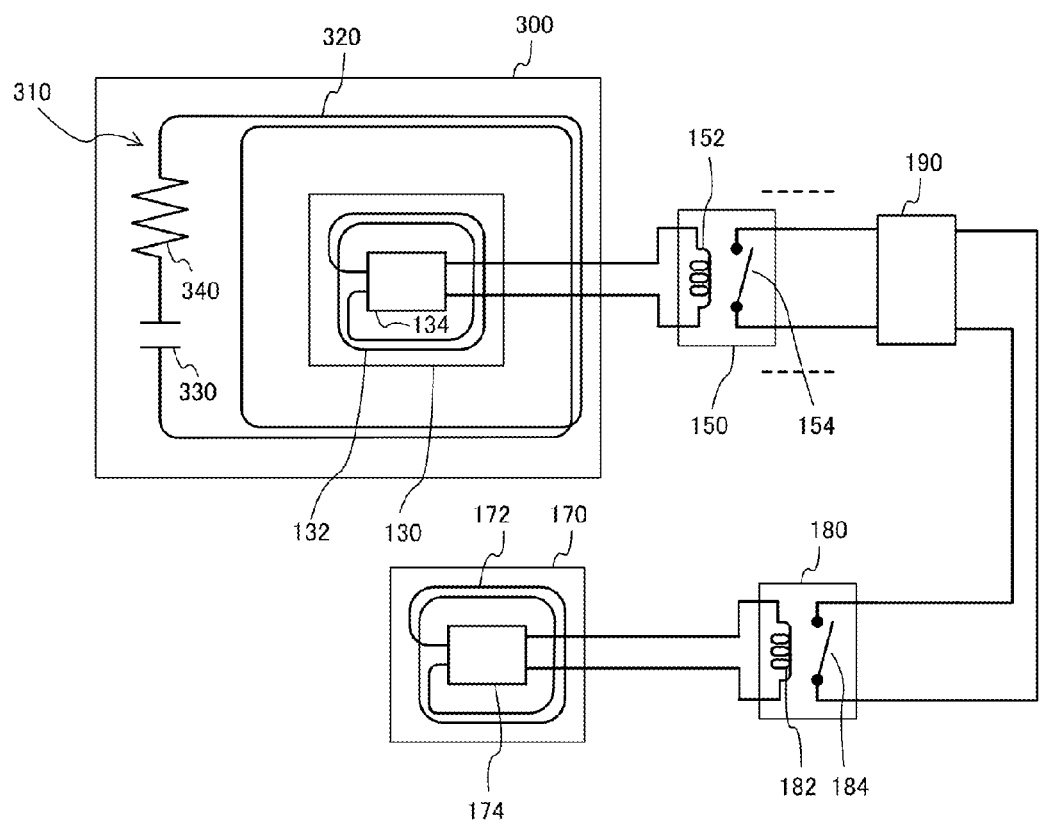
FIG. 10 is a diagram showing a structure in which the second antenna device 300 is connected with other ON/OFF control device.

As shown in FIGS. 9 and 10, the resonance device 310 is composed of a resonance circuit in which an antenna 320, a capacitor 330, and a resistor 340 are connected in series. More specifically, the resonance device 310 is composed of a so-called RLC series circuit.

In the resonance device 310, the antenna 320 is intended to be used in HF band, which is a so-called loop antenna. The antenna 320 is made of a conducting wire made into a shape of ring (loop). The antenna 320 acts as a coil of a predetermined inductance L. A magnetic-field component becomes predominant in the vicinity of the antenna 320.

The capacitor 330 has a capacitance C. Furthermore, the resistor 340 has a resistance value R. A resonance frequency in the resonance device 310 can be determined by appropriately determining the inductance L and the capacitance C. The resonance frequency is substantially equal to the frequency of the electromagnetic wave emitted from the first antenna device 1100.

The second antenna device 300 receives the electromagnetic wave emitted from the first antenna device 1100. The resonance device 310 generates the resonance wave having the resonance frequency substantially equal to the frequency of the received electromagnetic wave, and then outputs the resonance wave from the antenna 320.

The second antenna device 300 is not electrically connected to the structure of the first antenna device 1100 and the RF reader/writer 200 described below. Furthermore, the second antenna device 300 is arranged at the position away from the first antenna device 1100 and the RF reader/writer 200.

<<Electromagnetic Wave Generated by First Antenna Device 1100 and Electromagnetic Wave Generated by Second Antenna Device 300>>

The electromagnetic waves generated by the driving of the first antenna device 1100 and the driving of the second antenna device 300 will be simply described.

A part of the electromagnetic wave (a magnetic line of force) generated by the first antenna device 1100 reaches the second antenna device 300. The resonance device 310 of the second antenna device 300 resonates with the electromagnetic wave reached the second antenna device 300, and the electromagnetic wave (hereinafter referred to as a resonance electromagnetic wave) is generated by the resonance device 310 of the second antenna device 300. More specifically, the electromagnetic wave reached the second antenna device 300 resonates with the resonance device 310 of the second antenna device 300 to generate the resonance electromagnetic wave.

The electromagnetic wave generated by the first antenna device 1100 is combined with the electromagnetic wave generated by the resonance device 310 of the second antenna device 300. The strength of the combined electromagnetic wave is hereinafter referred to as composite electromagnetic field strength. Furthermore, the smallest strength of the electromagnetic wave for causing the electromotive force required for driving the control part 412 of the gaming chip 400 is referred to as the strength I0.

When the antenna 416 of the gaming chip 400 receives the electromagnetic wave having the strength of the strength I0 or more, it is possible to cause the electromotive force required for driving the control part 412 and the transmitting/receiving part 414. In contrast, when the antenna 416 of the gaming chip 400 receives the electromagnetic wave having the strength less than the strength I0, it is impossible to cause the electromotive force required for driving the control part 412 and the transmitting/receiving part 414. It is thus impossible to read from and write in the RFID IC tag.

Therefore, if the composite electromagnetic field strength exceeds the strength I0 at an arbitrary position on the way from the first antenna device 1100 to the second antenna device 300, the antenna 416 of the gaming chip 400 receives the electromagnetic wave having the strength of the strength I0 or more at an arbitrary position on the way from the first antenna device 1100 to the second antenna device 300. In this case, reception of the electromagnetic wave having the strength of the strength I0 or more makes it possible to power the control part 412 and the transmitting/receiving part 414 of the gaming chip 400. Powering drives the control part 412 and the transmitting/receiving part 414 so as to transmit the modulated wave including the chip identifying information to the first antenna device 1100. The gaming chip 400 can be arranged at a position on the way from the first antenna device 1100 to the second antenna device 300.

The distance between the first antenna device 1100 and the second antenna device 300 is adjusted so as to cause a sufficient electromotive force in the gaming chip 400. Thus, it is possible to read from and write in the RFID IC tag even if the gaming chip 400 is arranged at an arbitrary position between the first antenna device 1100 and the second antenna device 300.

Strength I1 of the electromagnetic wave generated by the first antenna device 1100 is adjusted, so that it is possible to determine the strength of the resonance electromagnetic wave generated by the resonance of the resonance device 310 of the second antenna device 300. In addition, the strength I1 of the electromagnetic wave emitted from the first antenna device 1100 can be determined by the control by the control part 210 of the RF reader/writer 200, and the RF reader/writer 200 can control the strength I1. In this manner, the control part 210 of the RF reader/writer 200 can constitute a strength setting device which adjusts and changes the strength of the electromagnetic wave emitted from the first antenna device 1100.

It is possible to determine the resonance condition in the resonance device 310 of the second antenna device 300 by appropriately adjusting the distance between the first antenna device 1100 and the second antenna device 300, a fixed number of each of the components mounted on the resonance circuit of the resonance device 310, the strength of the electromagnetic wave generated by the first antenna device 1100, etc.

The second embodiment has described the example using a single first antenna device 1100 and a single second antenna device 300. A single first antenna device 1100 and a plurality of second antenna devices 300 may be used.

<ON/OFF Control Device 130>

As shown in FIG. 9, the second antenna device 300 has the ON/OFF control device 130. In addition, the first embodiment has showed the antenna device 100 provided with the ON/OFF control device 130. Similar to the first embodiment, the ON/OFF control device 130 is the device for controlling the ON/OFF operation of the switching element 150.

The ON/OFF control device 130 has the antenna 132 and the ON/OFF control circuit 134, similar to the first embodiment. The antenna 132 and the ON/OFF control circuit 134 are structured similar to those in the first embodiment which operate in the same way as the first embodiment. Furthermore, the switching element 150 is also structured similar to that in the first embodiment which operates in the same way as the first embodiment. The switching element 150 is a relay element that carries out the ON/OFF operation, for example.

As mentioned above, a part of the electromagnetic wave (a magnetic line of force) generated by the first antenna device 1100 reaches the second antenna device 300. When the electromagnetic wave generated by the first antenna device 1100 reaches the antenna 132, the resonance electromagnetic wave is generated by the resonance device 310 of the second antenna device 300.

As shown in FIG. 9, the antenna 132 is arranged inside of the antenna 320. The magnetic field based on the electromagnetic wave reached from the first antenna device 1100 and the resonance electromagnetic wave generated by the resonance device 310 of the second antenna device 300 is applied to the antenna 132 of the ON/OFF control device 130. The antenna 132 acts as a coil to generate an induced current by the applied magnetic field.

In addition, although the example shown in FIG. 9 has exemplified the case in which the antenna 132 is arranged inside of the antenna 320, what is necessary is that the antenna 132 is arranged at the position where the electromagnetic wave generated by the first antenna device 1100 can reach to generate an induced current having a predetermined magnitude.

It is preferable that the antenna 132 is arranged in the substantially central region of the antenna 320. The magnitude of the magnetic field based on the resonance electromagnetic wave generated by the antenna 320 is the largest in the substantially central region of the antenna 320. The antenna 132 is arranged in the substantially central region of the antenna 320, so that the induced current generated at the antenna 132 can be larger.

<Switching Element 150>

The switching element 150 carries out the ON operation or the OFF operation, similar to the first embodiment. For example, a relay element and the like can be used as the switching element 150. The switching element 150 includes the coil 152, and the switch 154 that operates in response to a magnetic field generated by the coil 152. The switch 154 goes into the ON state upon supplying a voltage having a predetermined voltage value to the coil 152. The switch 154 goes into the OFF state upon not supplying a voltage having a predetermined voltage value to the coil 152.

The switch 154 goes into the ON state when the electromagnetic wave generated by the first antenna device 1100 reaches and the antenna 132 generates the induced current. In contrast, the switch 154 goes into the OFF state when the electromagnetic wave generated by the first antenna device 1100 does not reach and the antenna 132 does not generate the induced current.

<<ON/OFF Control Device 170>>

The example shown in FIG. 10 exemplifies the structure having an ON/OFF control device 170 aside from the ON/OFF control device 130 provided in the second antenna device 300. In addition, the ON/OFF control device 170 has the structure similar to that shown in the first embodiment and operates similarly. In the example shown in FIG. 10, the ON/OFF control device 170 controls the switching element 180. A control device that is controlled by the switching element 180 is referred to as the controlled circuit 190. The controlled circuit 190 is electrically connected with the ON/OFF control device 130, and also is electrically connected with the ON/OFF control device 170. The controlled circuit 190 is controlled by both the ON/OFF control device 130 and the ON/OFF control device 170.

<<Arrangement of First Antenna Device 1100 and Second Antenna Device 300>>

As shown in FIG. 6, the first embodiment has exemplified the case where the plurality of antenna devices 100 is arranged. Such an arrangement can be used in the bet table 800 shown in FIG. 11A. A plurality of first antenna devices 1100 and second antenna devices 300 can be arranged also in the second embodiment (not shown). In the second embodiment, a single first antenna device 1100 and a single second antenna device 300 can be paired up with each other to arrange a plurality of pairs thereof. This can be used for the chip tray structure 600 described below, etc.

When the plurality of first antenna devices 1100 and second antenna devices 300 are arranged, the switching element 150 of the second antenna device 300 is electrically connected with the controlled circuit 190, similar to the first embodiment (refer to FIG. 6). The controlled circuit 190 is connected with the antenna for demagnetizing field generation 160 and the like (not shown). For example, in the structure in which the controlled circuit 190 is connected with the antenna for demagnetizing field generation 160, the switching element 150 of the second antenna device 300 is operated to be turned on and off in response to the supply of the RF signal to the first antenna device 1100 so as to carry out the ON/OFF operation of the antenna for demagnetizing field generation 160, thereby generating and extinguishing the magnetic field.

In addition, what is necessary is that a single first antenna device 1100 pairs up with a single second antenna device 300 to be able to operate together. At least one of the first antenna device 1100 and the second antenna device 300 may be arranged to be shared. With regard to the chip tray structure 600 described below, an example will be shown in which the first antenna device 1100 is shared by both the second antenna devices 300a and 300b. Furthermore, a single second antenna device 300 can be shared and operated by two first antenna devices 1100. In this case, of course, each of the first antenna devices 1100 and the second antenna device 300 are located in which they can resonate with one another.

<<Chip Tray Structure 600>>

FIG. 12 is a perspective view showing the chip tray structure 600. The chip tray structure 600 has a three-layer structure composed of the chip tray 610, the base plate cover 620, and the base 630. Furthermore, the lid body 660 is provided for covering the top of the chip tray 610. The lid body 660 can be locked with the chip tray 610.

The chip tray 610 is a tray for accommodating the gaming chip 400 that is given to a player, and the gaming chip 400 that is collected from a player. A plurality of grooves 640, 18 grooves 640 for example, for accommodating the gaming chip 400 is formed on the chip tray 610 from the front side toward the back side. One groove 640 can accommodate 30 gaming chips 400.

It is possible to provide the first antenna device 1100 and the second antenna device 300 on the chip tray structure 600 to manage the gaming chip 400 by the chip identifying information of the gaming chip 400 accommodated in the chip tray structure 600.

Figure 13:
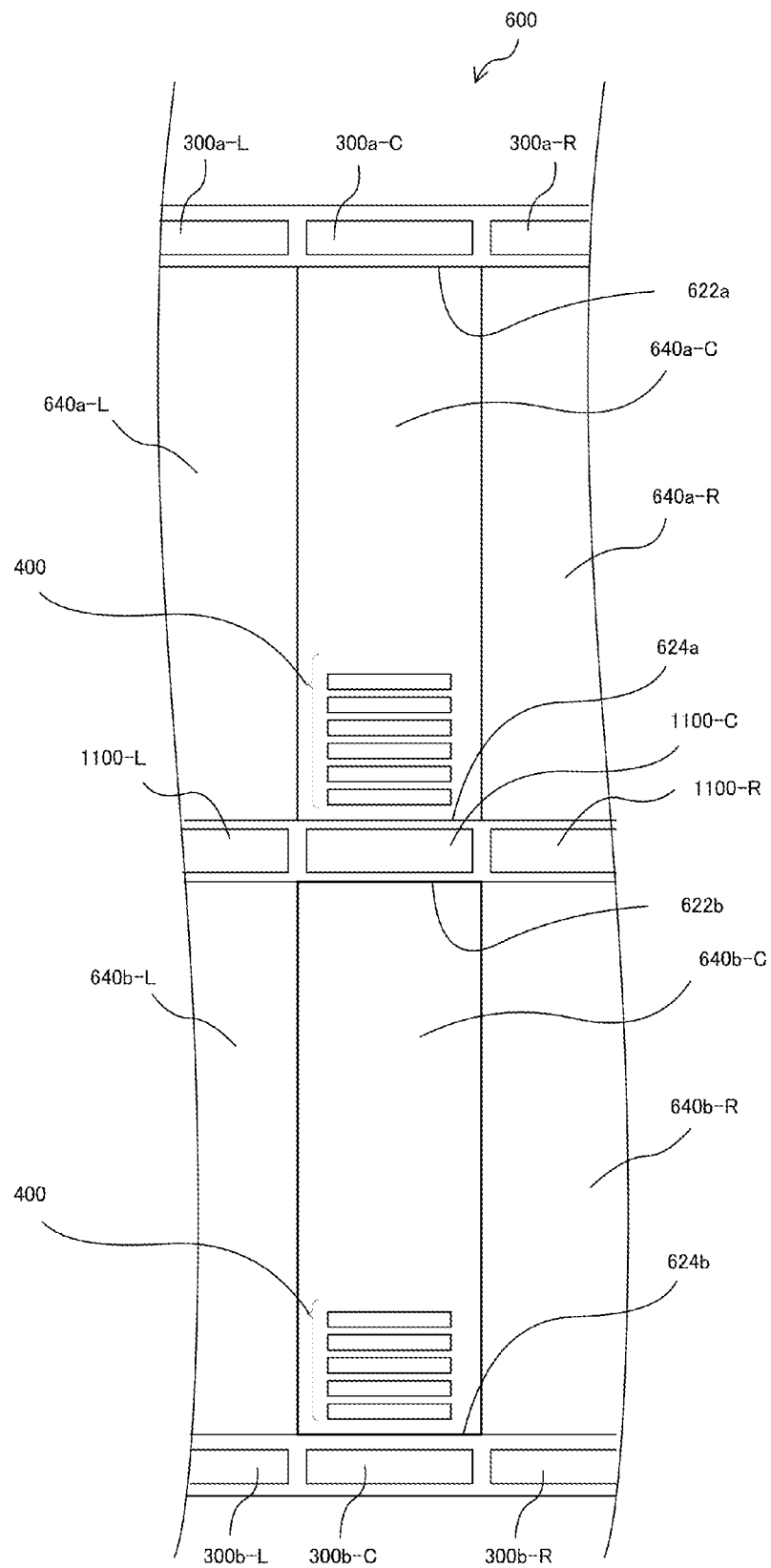
FIG. 13 is a diagram showing the first antenna device 100 and the second antenna device 300 which are provided in two grooves 640 aligned in series with each other.

FIG. 13 is a diagram showing an overview of the first antenna device 100 and the second antenna device 300 which are provided in two grooves 640 aligned in series with each other on the chip tray 610. In addition, FIG. 13 is a diagram showing six grooves 640 adjacent to one another by extracting them from 18 grooves 640.

In FIG. 13, two grooves 640 aligned in series in the center of the figure are referred to as a groove a-C and a groove b-C. Likewise, two grooves 640 aligned in series on the left side in the figure are referred to as a groove a-L and a groove b-L, and two grooves 640 aligned in series on the right side in the figure are referred to as a groove a-R and a groove b-R. In addition, the grooves positioned at the center, right and left are simply referred to as a groove 640a or a groove 640b when it is unnecessary to make distinction among them in particular below. Furthermore, the groove 640a and the groove 640b are simply referred to as a groove 640 if it is unnecessary to make distinction between them.

Each of the groove 640a and the groove 640b has the shapes of elongated semicylinder whose cross section is a substantially semicircle. The groove 640a has a first end portion 622a and a second end portion 624a. The first end portion 622a and the second end portion 624a are formed opposite to each other at the farthest positions from each other in the longitudinal direction of the groove 640a. At most 30 gaming chips 400 are accommodated between the first end portion 622a and the second end portion 624a in the groove 640a. Likewise, the groove 640b has a first end portion 622b and a second end portion 624b. The first end portion 622b and the second end portion 624b are formed opposite to each other at the farthest positions from each other in the longitudinal direction of the groove 640b. At most 30 gaming chips 400 are accommodated between the first end portion 622b and the second end portion 624b in the groove 640b.

The first antenna device 1100 is arranged between the second end portion 624a of the groove 640a and the first end portion 622b of the groove 640b. The first antenna device 1100 arranged at the center of the figure is hereinafter referred to as a first antenna device 1100-C. Likewise, the first antenna device 1100 arranged on the left side of the figure is referred to as a first antenna device 1100-L, and the first antenna device 1100 arranged on the right side of the figure is referred to as a first antenna device 1100-R. In addition, the first antennas positioned at the center, right and left are simply referred to as the first antenna devices 1100 when it is unnecessary to make distinction among them particular below.

The first antenna device 1100 is a loop antenna as described above. The antenna 416 of the gaming chip 400 is also a loop antenna. The first antenna device 1100 is arranged so that the looping surface of the first antenna device 1100 is placed substantially in parallel with the looping surface of the gaming chip 400 accommodated in the groove 640*a* and the groove 640*b*. In this manner, the magnetic line of force emitted from the first antenna device 1100 can certainly penetrate the loop antenna of the gaming chip 400, and thus the electromagnetic wave can be efficiently transmitted and received between the first antenna device 1100 and the gaming chip 400.

The second antenna device 300*a* is arranged on the side of the first end portion 622*a* of the groove 640*a* as well as the outside of the groove 640*a*. Likewise, the second antenna device 300*b* is arranged on the side of the second end portion 624*b* of the groove 640*b* as well as the outside of the groove 640*b*.

The second antenna device 300*a* arranged in the center of the figure is hereinafter referred to as a second antenna device 300*a*-C. Likewise, the second antenna device 300*a* arranged on the left side of the figure is referred to as a second antenna device 300*a*-L, and the second antenna device 300*a* arranged on the right side of the figure is referred to as a second antenna device 300*a*-R. In addition, the second antenna devices positioned at the center, right and left are simply referred to as the second antenna devices 300*a* when it is unnecessary to make distinction among them particular below.

The second antenna device 300*b* arranged in the center of the figure is hereinafter referred to as a second antenna device 300*b*-C. Likewise, the second antenna device 300*b* arranged on the left side of the figure is referred to as a second antenna device 300*b*-L, and the second antenna device 300*b* arranged on the right side of the figure is referred to as a second antenna device 300*b*-R. In addition, the second antenna devices positioned at the center, right and left are simply referred to as the second antenna devices 300*b* when it is unnecessary to make distinction among them particular below.

The second antenna devices 300*a* and 300*b* are also loop antennas as described above. The second antenna devices 300*a* and 300*b* are arranged so that the looping surfaces of the second antenna devices 300*a* and 300*b* are placed substantially in parallel with the looping surface of the first antenna device 1100. In this manner, it is possible to efficiently resonate with the electromagnetic wave emitted from the first antenna device 1100, so that the range in which the first antenna device 1100 reads the gaming chip 400 can be expanded stably.

The strength of the electromagnetic wave generated by the first antenna device 1100 is determined in accordance with the length in the longitudinal direction of the groove 640*a*. More specifically, the electromagnetic wave output of the first antenna device 1100 and the resonance conditions of each of the second antenna devices 300 are determined so that the composite electromagnetic field strength becomes the strength I0 or more as described above over the area from the first end portion 622*a* of the groove 640*a* to the second end portion 624*a*. In this manner, it is possible to cause the electromotive force necessary for driving the control part 412 and the transmitting/receiving part 414 wherever in the groove 640*a* the gaming chip 400 is placed, and thus to read from and write in the RFID IC tag.

This also applies to the groove 640*b*. It is possible to cause the electromotive force necessary for driving the control part 412 and the transmitting/receiving part 414 wherever in the groove 640*b* the gaming chip 400 is placed, and thus to read from and write in the RFID IC tag.

In this manner, two second antenna devices 300 (one second antenna device 300 and the other second antenna device 300) are provided so as to sandwich the first antenna device 1100 therebetween. An accommodating part capable of accommodating at least one gaming chip 400 is provided between the first antenna device 1100 and one second antenna device 300. Furthermore, an accommodating part capable of accommodating at least one gaming chip 400 is provided between the first antenna device 1100 and the other second antenna device 300.

With regard to the gaming chip 400 accommodated between the first antenna device 1100 and one second antenna device 300, the chip identifying information thereof is read by the first antenna device 1100 and one second antenna device 300. Likewise, with regard to the gaming chip 400 accommodated between the first antenna device 1100 and the other second antenna device 300, the chip identifying information thereof is read by the first antenna device 1100 and the other second antenna device 300.

In this manner, the first antenna device 1100 and the second antenna device 300 are arranged relative to the two grooves 640 aligned in parallel with each other in the chip tray structure 600, so that it is possible to read the chip identifying information of all of the gaming chips 400 accommodated within the chip tray structure 600.

It is preferable that the chip tray 610, the base plate cover 620, the base 630, and the lid body 660 are constituted by a non-metallic material such as a plastic. Using a non-metallic material makes it possible to generate a desired electromagnetic wave certainly from the first antenna device 1100 and one second antenna device 300.

What is claimed is:

1. An identifying information access device for reading and writing identifying information stored in an RFID IC tag included in a storage medium, comprising:
    an electromagnetic wave generating antenna part for generating an electromagnetic wave;
    a non-contact control device formed to have no electrical contact with the electromagnetic wave generating antenna part and integrally with the electromagnetic wave generating antenna part, the non-contact control device receiving an electromagnetic wave generated by the electromagnetic wave generating antenna part to generate electric power, and controlling a controlled device based on the generated electric power; and
    at least one sub-control device having an electrical contact with the controlled device and controlling the controlled device separately from the non-contact control device, wherein the sub-control device receives an electromagnetic wave to generate electric power and controls the controlled device based on the generated electric power.

2. The identifying information access device according to claim 1, wherein:
    the non-contact control device has an electromagnetic wave receiving antenna part for receiving an electromagnetic wave generated by the electromagnetic wave generating antenna part; and
    the electromagnetic wave receiving antenna part is formed integrally with the electromagnetic wave generating antenna part on an antenna base plate.

3. The identifying information access device according to claim 2, further comprising a reading/writing control device for controlling the reading and writing of the identifying information by supplying an RF signal to the electromagnetic wave generating antenna part, wherein:

the electromagnetic wave receiving antenna part has no electrical contact with the reading/writing control device and the electromagnetic wave generating antenna part.

4. The identifying information access device according to claim 2, wherein:
the electromagnetic wave receiving antenna part generates an induced current based on the received electromagnetic wave; and
the non-contact control device generates electric power based on the induced current to supply the electric power to the controlled device, and drives the controlled device to go into ON state or OFF state.

5. The identifying information access device according to claim 1, comprising at least one magnetic field control antenna part connected to the controlled device and arranged in the vicinity of the electromagnetic wave generating antenna part, wherein:
the magnetic field control antenna part emits a predetermined magnetic field upon going into ON state by the controlled device.

6. An identifying information access device for reading and writing identifying information stored in an RFID IC tag included in a storage medium, comprising:
an electromagnetic wave generating antenna part for generating an electromagnetic wave;
a resonance antenna part formed to have no electrical contact with the electromagnetic wave generating antenna part, the resonance antenna part having a resonance part for receiving an electromagnetic wave emitted from the electromagnetic wave generating antenna part and resonating with the received electromagnetic wave to generate a resonance electromagnetic wave;
a non-contact control device formed to have no electrical contact with the electromagnetic wave generating antenna part and the resonance antenna part and integrally with the resonance antenna part, the non-contact control device receiving an electromagnetic wave generated by the resonance antenna part to generate electric power, and controlling a controlled device based on the generated electric power; and
at least one sub-control device having an electrical contact with the controlled device and controlling the controlled device separately from the non-contact control device, wherein the sub-control device receives an electromagnetic wave to generate electric power and controls the controlled device based on the generated electric power.

7. The identifying information access device according to claim 6, wherein:
the non-contact control device has an electromagnetic wave receiving antenna part for receiving an electromagnetic wave generated by a resonance antenna part; and
the electromagnetic wave receiving antenna part is formed integrally with the resonance antenna part on an antenna base plate.

8. The identifying information access device according to claim 7, further comprising a reading/writing control device for controlling the reading and writing of the identifying information by supplying an RF signal to the electromagnetic wave generating antenna part, wherein:
the electromagnetic wave receiving antenna part has no electrical contact with the reading/writing control device, the electromagnetic wave generating antenna part, and the resonance antenna part.

9. The identifying information access device according to claim 7, wherein:
the resonance antenna part generates an induced current based on the received electromagnetic wave; and
the non-contact control device generates power based on the induced current to supply the electric power to the controlled device, and brings the controlled device into ON state or OFF state.

* * * * *